US008832851B2

(12) United States Patent
Li et al.

(10) Patent No.: US 8,832,851 B2
(45) Date of Patent: Sep. 9, 2014

(54) USER BASED LICENSING FOR APPLICATIONS

(71) Applicant: Microsoft Corporation, Redmond, WA (US)

(72) Inventors: Karvell Li, Bellevue, WA (US); Robert Donner, Bellevue, WA (US); Amit Wadhwa, Bellevue, WA (US); Danny R. Amirault, Bellevue, WA (US); Sanjay Garg, Redmond, WA (US); Gregory Akselrod, Seattle, WA (US); Scott Kurtzeborn, Redmond, WA (US); Donald Gordon Hardy, Seattle, WA (US); Tianyu Xie, Redmond, WA (US); Chad Shurtz, Marysville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/680,120

(22) Filed: Nov. 19, 2012

(65) Prior Publication Data
US 2013/0198856 A1  Aug. 1, 2013

Related U.S. Application Data

(60) Provisional application No. 61/591,703, filed on Jan. 27, 2012.

(51) Int. Cl.
*G06F 7/04* (2006.01)
*H04N 7/167* (2011.01)

(52) U.S. Cl.
USPC ............................................ 726/27; 380/201

(58) Field of Classification Search
USPC .................... 726/26–28, 7, 35; 713/158, 167; 380/201
See application file for complete search history.

(56) References Cited

U.S. PATENT DOCUMENTS

| | | | | |
|---|---|---|---|---|
| 6,510,513 | B1 * | 1/2003 | Danieli .......................... | 713/156 |
| 6,915,278 | B1 * | 7/2005 | Ferrante et al. ................ | 705/59 |
| 6,957,276 | B1 * | 10/2005 | Bahl ............................. | 709/245 |
| 6,993,664 | B2 * | 1/2006 | Padole et al. ................. | 705/59 |
| 7,043,020 | B2 * | 5/2006 | Maillard et al. ............. | 380/227 |
| 7,089,594 | B2 * | 8/2006 | Lal et al. ........................ | 726/31 |
| 7,120,429 | B2 * | 10/2006 | Minear et al. ................ | 455/419 |
| 7,343,297 | B2 * | 3/2008 | Bergler et al. ................ | 705/59 |
| 7,464,103 | B2 * | 12/2008 | Siu et al. ............................. | 1/1 |
| 7,493,487 | B2 * | 2/2009 | Phillips et al. ................ | 713/168 |

(Continued)

OTHER PUBLICATIONS

"Cisco Collaborative Conferencing", Retrieved at <<http://www.cisco.com/en/US/docs/voice_ip_comm/cucm/srnd/8x/confernc.html>>, Retrieved Date: Aug. 22, 2012, pp. 21.

(Continued)

*Primary Examiner* — Farid Homayounmehr
*Assistant Examiner* — Abu Sholeman
(74) *Attorney, Agent, or Firm* — Steve Crocker; Sade Fashokun; Micky Minhas

(57) ABSTRACT

A method, system, and computer-readable storage media for providing user based licensing of an application are provided herein. The method includes receiving user log-in information from a computing device at a licensing service in response to an input by a user and providing a license for an application to the computing device, wherein the license includes device specific information associated with the user. The method also includes activating the application on the computing device using the device specific information.

20 Claims, 34 Drawing Sheets

(56) References Cited

U.S. PATENT DOCUMENTS

| | | | |
|---|---|---|---|
| 7,506,382 B2* | 3/2009 | Padole et al. | 726/30 |
| 7,519,816 B2* | 4/2009 | Phillips et al. | 713/168 |
| 7,539,863 B2* | 5/2009 | Phillips et al. | 713/168 |
| 7,540,024 B2* | 5/2009 | Phillips et al. | 726/20 |
| 7,551,738 B2* | 6/2009 | Medvinsky et al. | 380/203 |
| 7,555,126 B2* | 6/2009 | Okada et al. | 380/251 |
| 7,587,518 B2* | 9/2009 | Bahl | 709/245 |
| 7,596,625 B2* | 9/2009 | Manion et al. | 709/232 |
| 7,716,137 B2* | 5/2010 | Smith et al. | 705/52 |
| 7,792,756 B2* | 9/2010 | Plastina et al. | 705/51 |
| 7,801,819 B2* | 9/2010 | Swenson et al. | 705/52 |
| 7,849,019 B2* | 12/2010 | Grimm et al. | 705/59 |
| 7,966,261 B2* | 6/2011 | Candelore | 705/57 |
| 8,011,015 B2* | 8/2011 | Singer et al. | 726/31 |
| 8,099,791 B1* | 1/2012 | Adkins et al. | 726/34 |
| 8,107,626 B2* | 1/2012 | Guzman et al. | 380/239 |
| 8,151,332 B2* | 4/2012 | Cross et al. | 726/7 |
| 8,261,096 B2* | 9/2012 | Takashima et al. | 713/193 |
| 8,682,795 B2* | 3/2014 | Lenkov et al. | 705/51 |
| 2002/0107809 A1* | 8/2002 | Biddle et al. | 705/59 |
| 2002/0174356 A1* | 11/2002 | Padole et al. | 713/200 |
| 2003/0084306 A1* | 5/2003 | Abburi et al. | 713/188 |
| 2003/0135756 A1* | 7/2003 | Verma | 713/201 |
| 2004/0172533 A1* | 9/2004 | DeMello et al. | 713/164 |
| 2005/0182727 A1 | 8/2005 | Robert et al. | |
| 2005/0216420 A1* | 9/2005 | Padole et al. | 705/59 |
| 2006/0031222 A1* | 2/2006 | Hannsmann | 707/10 |
| 2006/0069653 A1* | 3/2006 | Lelikov et al. | 705/59 |
| 2006/0248596 A1* | 11/2006 | Jain et al. | 726/27 |
| 2007/0027815 A1* | 2/2007 | Sobel et al. | 705/59 |
| 2007/0150967 A1* | 6/2007 | Takahashi | 726/31 |
| 2007/0263865 A1* | 11/2007 | Cohen et al. | 380/201 |
| 2007/0274519 A1* | 11/2007 | Cohen et al. | 380/201 |
| 2008/0083025 A1 | 4/2008 | Meijer et al. | |
| 2008/0109911 A1* | 5/2008 | Tedesco et al. | 726/30 |
| 2008/0148412 A1* | 6/2008 | Okada | 726/28 |
| 2008/0215450 A1 | 9/2008 | Gates et al. | |
| 2008/0222044 A1* | 9/2008 | Gottlieb et al. | 705/59 |
| 2008/0235141 A1* | 9/2008 | Hilerio et al. | 705/59 |
| 2008/0243699 A1* | 10/2008 | Hilerio et al. | 705/59 |
| 2009/0138975 A1* | 5/2009 | Richardson | 726/32 |
| 2009/0165083 A1* | 6/2009 | Mclean et al. | 726/1 |
| 2009/0192943 A1* | 7/2009 | Dubhashi et al. | 705/59 |
| 2009/0254482 A1* | 10/2009 | Vadlamani et al. | 705/59 |
| 2009/0259591 A1* | 10/2009 | Starostin et al. | 705/59 |
| 2010/0023592 A1* | 1/2010 | Parsons et al. | 709/206 |
| 2010/0031373 A1* | 2/2010 | Hamid | 726/29 |
| 2011/0067117 A1* | 3/2011 | Nagumo et al. | 726/30 |
| 2011/0131315 A1 | 6/2011 | Ferris et al. | |
| 2011/0208797 A1* | 8/2011 | Kim | 709/202 |
| 2011/0213884 A1 | 9/2011 | Ferris et al. | |
| 2012/0023596 A1* | 1/2012 | Womack et al. | 726/29 |
| 2012/0029681 A1* | 2/2012 | Hoshiyama | 700/117 |
| 2012/0041844 A1 | 2/2012 | Shen et al. | |
| 2012/0079095 A1 | 3/2012 | Evans et al. | |
| 2012/0101949 A1* | 4/2012 | Pence et al. | 705/59 |
| 2012/0133731 A1* | 5/2012 | Lin et al. | 348/42 |
| 2013/0031642 A1* | 1/2013 | Dwivedi et al. | 726/29 |
| 2013/0144633 A1* | 6/2013 | Guadarrama et al. | 705/1.1 |
| 2013/0144755 A1* | 6/2013 | Mowatt et al. | 705/26.41 |
| 2013/0167242 A1* | 6/2013 | Paliwal | 726/26 |
| 2013/0179987 A1* | 7/2013 | Wiltgen et al. | 726/26 |
| 2013/0191923 A1* | 7/2013 | Abuelsaad et al. | 726/26 |
| 2013/0198038 A1* | 8/2013 | Mowatt et al. | 705/26.41 |
| 2013/0198856 A1* | 8/2013 | Li et al. | 726/27 |
| 2013/0227282 A1* | 8/2013 | Coley et al. | 713/167 |

OTHER PUBLICATIONS

"Overview of licensing and activation in Office 365 ProPlus Preview", Retrieved at <<http://technet.microsoft.com/en-us/library/gg982959(v=office.15).aspx>>, Jul. 16, 2012, pp. 3.

* cited by examiner

100

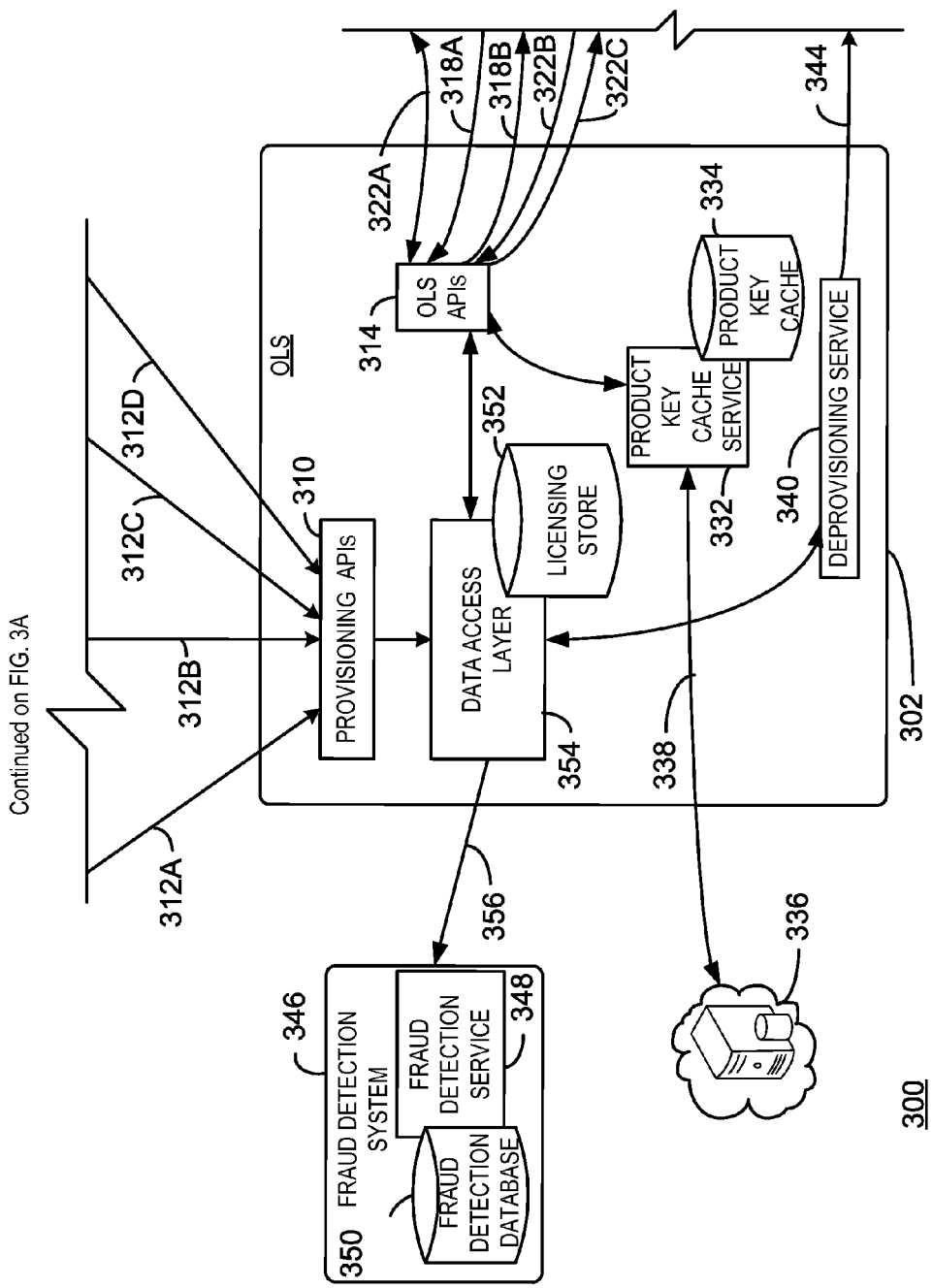

1500

1600

1800

1900

2400

2700

2800

USER BASED LICENSING FOR APPLICATIONS

CROSS-REFERENCE TO RELATED APPLICATION

The present application claims the benefit of U.S. Provisional Patent Application Ser. No. 61/591,703 by Li et al., which is entitled "Application Licensing Service" and was filed 27 Jan. 2012, the disclosure of which is incorporated herein by this reference as though fully set forth herein.

BACKGROUND

Licenses, or entitlements, are generally used to control the manner in which client computing devices may access particular applications, such as, for example, word processing applications, spreadsheet applications, and presentation applications. Typically, each type of client computing device has a distinct licensing service, wherein the type of a client computing device may include a particular operating system (OS) of the client computing device or a brand of the client computing device, for example. However, the use of such distinct licensing services for each type of client computing device results in several limitations. For example, high costs may be associated with building and sustaining a separate licensing service for each type of client computing device. In addition, it may be desirable to provide bundling offers, which include licenses for one or more applications that may be used on multiple types of client computing devices. However, the use of separate licensing services may preclude such bundling offers, since bundling relies on integration between many different types of devices or systems. Further, it may be difficult for a marketplace service to integrate with each separate licensing service for the selling of licenses, and consistent proof of license ownership may be difficult to attain. For example, one licensing service may use product keys, while another licensing service may use tokens.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for providing user based licensing of an application. The method includes receiving user log-in information from a computing device at a licensing service in response to an input by a user, providing a license for an application to the computing device, wherein the license includes device specific information associated with the user, and activating the application on the computing device using the device specific information.

Another embodiment provides a system for providing user based licensing of an application. The system includes a licensing service that is configured to receive user log-in information from a computing device in response to an input by a user, provide a license for an application to the computing device, wherein the license includes device specific information associated with the user, and activate the application on the computing device using the device specific information.

Another embodiment provides one or more computer-readable storage media including a number of instructions that, when executed by a processor, cause the processor to receive user log-in information from a computing device and provide a license for an application to the computing device, wherein the license includes device specific information associated with a user. The instructions also cause the processor to activate the application on the computing device using the device specific information, periodically determine a state of the license, and adjust conditions of the license according to the state of the license.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A, 3B, and 3C show a schematic of a licensing system that may be used to manage licenses for applications;

DETAILED DESCRIPTION

Figure 1:
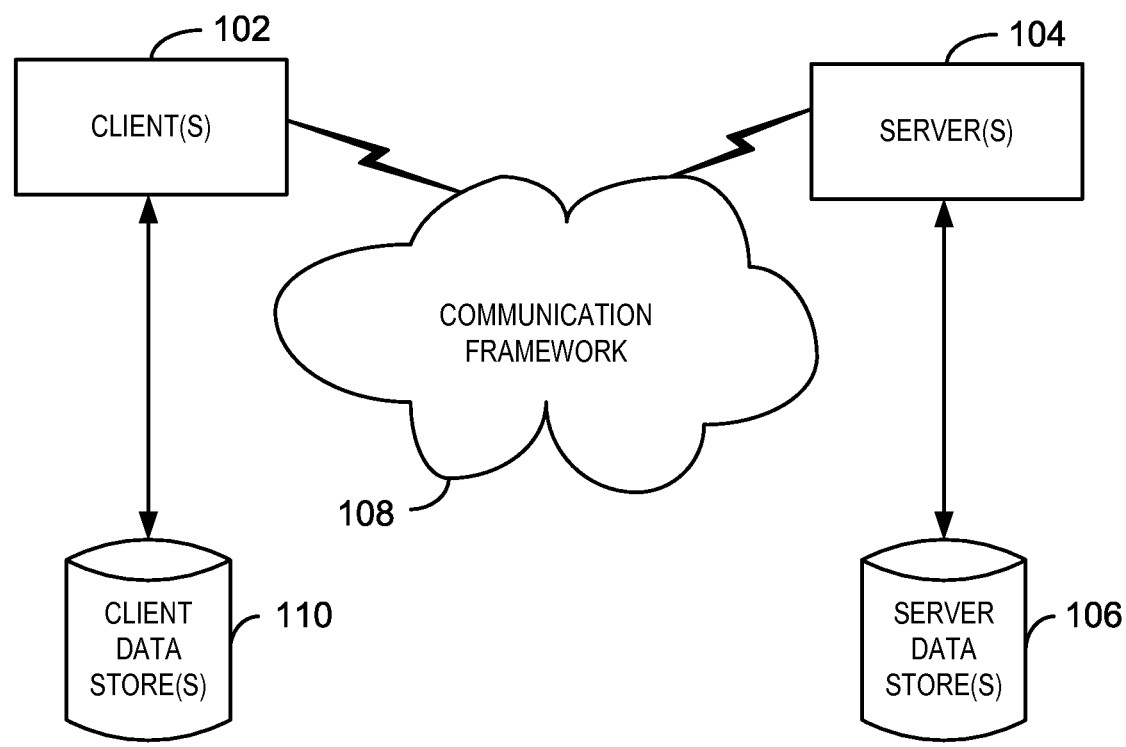
FIG. 1 is a block diagram of a networking environment that may be used to implement the licensing service described herein.

Embodiments disclosed herein set forth methods and systems for application licensing according to various criteria and techniques. As used herein, the term "application" may refer to an application, program, or service implemented within a computing environment. Applications that may be utilized in accordance with the licensing service described herein include, but are not limited to, MICROSOFT WORD, MICROSOFT EXCEL, MICROSOFT POWERPOINT, MICROSOFT VISIO, or MICROSOFT SHAREPOINT, all of which are available from Microsoft Corporation of Redmond, Wash. Applications may be provided to a computing device by a marketplace service, or any of a number of third party services, via a network. Various different types of licenses, or entitlements, for such applications can be obtained through a variety of different methods.

The licensing service described herein solves the problems discussed above with respect to the use of separate licensing services by providing an extensible and consistent way to license new client computing devices. In addition, the licensing service allows new partners, i.e., commerce partners, to easily sell applications by isolating the licensing process from the purchasing process. In addition, the licensing service enables offers which span across different clients, or client devices. The licensing service also allows a user of different clients to prove they are provisioned to use an application via a single set of credentials. Furthermore, the licensing service allows for the inclusion of a synchronizing license period across devices and services, even when a device goes offline. This may allow the experience on all devices and services to remain consistent when a subscription lapses.

The licensing service may be referred to herein as the "Office Licensing Service," or "OLS," since it may be used to license MICROSOFT OFFICE, i.e., "Office," applications available from Microsoft Corporation of Redmond, Wash., such as the ones listed above. However, it is to be understood that the licensing service may also be used to license any other suitable types of applications available from any number of providers.

In various embodiments, the OLS provides the ability to use multiple licensing methods through a consistent, expandable, and well-defined set of protocols. Such licensing methods may include, for example, product key based licensing, online user based licensing, device based licensing, and token based licensing, among others.

In some embodiments, the OLS is configured to periodically check a user's license state. This may allow for a balance between the ability to use the product offline and the ability to obtain the latest licensing information, e.g., whether a license has been deprovisioned. The user's license state may be referred to as the "subscription heartbeat." The subscription heartbeat may be used to determine whether a license for an application is to be disabled, thereby deactivating the corresponding application.

The OLS may provide for the synchronization of the user's license state across multiple devices and services. In some embodiments, the OLS enables devices running Office, e.g. PC, Mac, Mobile, or Slates, among others, and Office Services, e.g., roaming settings, to have a consistent license state. Thus, when a user's subscription lapses, access to clients and services may be severed at the same time. In addition, by presetting the amount of offline license time that is allowed for a particular device, the license state can be synchronized even if the user goes offline.

Further, the OLS may provide for the tolerance of offline clients, as well as the detection of fraud. For example, the OLS may include logic that determines when a new client is requesting a license versus when an existing client is requesting a renewed license. The OLS may also include logic that determines when a user is performing fraudulent activities, such as requesting excessive numbers of new licenses, while still allowing a user to add and remove devices and maintain a certain number of active devices.

In various embodiments, the OLS provides for licensing of devices. For example, the OLS may provide for licensing of MOX devices, wherein the term "MOX" generally refers to all Windows 8 Slate devices. The OLS may provide such licensing using credentials and an OLS license. An OLS license is a new form of license that is different from traditional authorization granted via a product key. An OLS license may include configurable license check periods configured from the server outside the traditional system, e.g., the traditional Office Software Protection Platform (OSPP) system.

In various embodiments, the OLS may provide licensing for services. Specifically, the OLS may provide a scalable way to provide licensing for services using a poll model, wherein a service would query the OLS as appropriate. The OLS may cache provisioning/license information for a certain amount of time on the service or client themselves in order to make the system scalable. In addition, a push model may be used to provide licensing for services.

The OLS may allow for disaster resilience. For example, a close to zero day recovery point and close to zero minute recovery time may be achieved via geographically distributed servers that are kept in sync using custom geographical replication logic. This may be accomplished by separating information that is to be kept in sync at all times from information that can be in sync to a certain degree, and then synchronizing the information via a pool of sync providers. In addition, locking mechanisms may be used to avoid overwrites.

Further, the OLS may provide for user based licensing. Licensing information for using the rich client application may be sent from the server, and may be based on the user's log-in information. The licensing information may be retained on the server instead of the client, and the licensing information may be roamed along with the user on the server. This may be used in a number of scenarios, such as for roaming applications or for initial acquisition before key based licensing is used.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As used herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible computer-readable storage device, or media.

Computer-readable storage media include storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media (i.e., not storage media) may additionally include communication media such as transmission media for communication signals and the like.

Moreover, the word "exemplary" is used herein to mean serving as an example, instance, or illustration. Any aspect or design described herein as "exemplary" is not necessarily to be construed as preferred or advantageous over other aspects or designs.

Computing Environment

Figure 2:
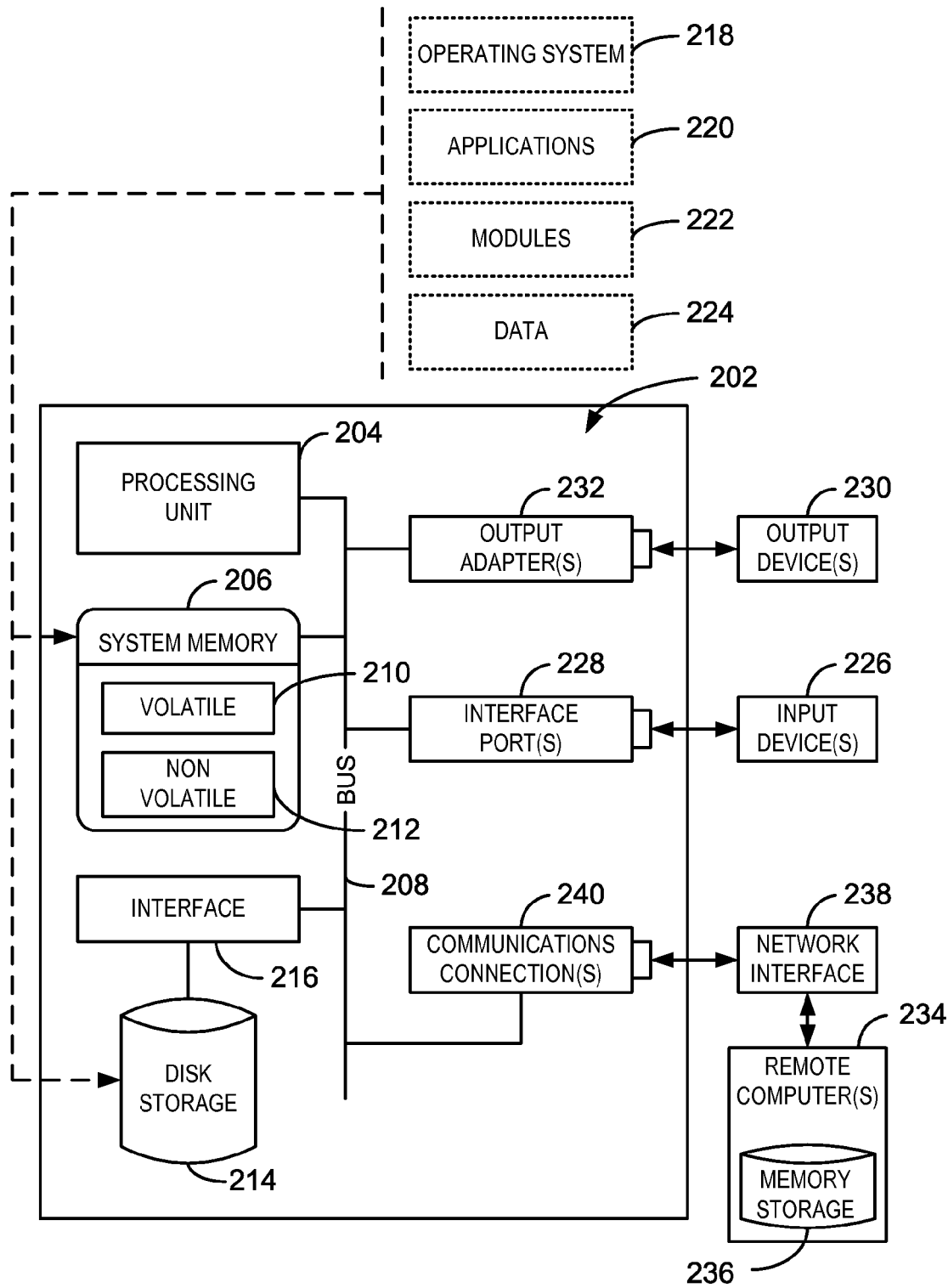
FIG. 2 is a block diagram of a computing environment that may be used to implement the licensing service described herein.

In order to provide context for implementing various aspects of the claimed subject matter, FIGS. 1-2 and the following discussion are intended to provide a brief, general description of a computing environment in which the various aspects of the subject innovation may be implemented. For example, a method and system for licensing an application can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, etc., that perform particular tasks or implement particular abstract data types.

Moreover, those of skill in the art will appreciate that the subject innovation may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 1 is a block diagram of a networking environment 100 that may be used to implement the licensing service described herein. The networking environment 100 includes one or more client(s) 102. The client(s) 102 can be hardware and/or software (e.g., threads, processes, or computing devices). The networking environment 100 also includes one or more server(s) 104. The server(s) 104 can be hardware and/or software (e.g., threads, processes, or computing devices). The servers 104 can house threads to perform search operations by employing the subject innovation, for example.

One possible communication between a client 102 and a server 104 can be in the form of a data packet adapted to be transmitted between two or more computer processes. The networking environment 100 includes a communication framework 108 that can be employed to facilitate communications between the client(s) 102 and the server(s) 104. The client(s) 102 are operably connected to one or more client data store(s) 110 that can be employed to store information local to the client(s) 102. The client data store(s) 110 may be stored in the client(s) 102, or may be located remotely, such as in a cloud server. Similarly, the server(s) 104 are operably connected to one or more server data store(s) 106 that can be employed to store information local to the servers 104.

FIG. 2 is a block diagram of a computing environment that may be used to implement the licensing service described herein. The computing environment 200 includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

The system bus 208 can be any of several types of bus structures, including the memory bus or memory controller, a peripheral bus or external bus, or a local bus using any variety of available bus architectures known to those of ordinary skill in the art. The system memory 206 is computer-readable storage media that includes volatile memory 210 and non-volatile memory 212. The basic input/output system (BIOS), containing the basic routines to transfer information between elements within the computer 202, such as during start-up, is stored in non-volatile memory 212. By way of illustration, and not limitation, non-volatile memory 212 can include read-only memory (ROM), programmable ROM (PROM), electrically-programmable ROM (EPROM), electrically-erasable programmable ROM (EEPROM), or flash memory.

Volatile memory 210 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 202 also includes other computer-readable storage media, such as removable/non-removable, volatile/non-volatile computer storage media. FIG. 2 shows, for example, a disk storage 214. Disk storage 214 includes, but is not limited to, devices like a magnetic disk drive, floppy disk drive, tape drive, Jaz drive, Zip drive, LS-100 drive, flash memory card, or memory stick.

In addition, disk storage 214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 214 to the system bus 208, a removable or non-removable interface is typically used, such as interface 216.

It is to be appreciated that FIG. 2 describes software that acts as an intermediary between users and the basic computer resources described in the computing environment 200. Such software includes an operating system 218. The operating system 218, which can be stored on disk storage 214, acts to control and allocate resources of the computer 202.

System applications 220 take advantage of the management of resources by the operating system 218 through program modules 222 and program data 224 stored either in system memory 206 or on disk storage 214. It is to be appreciated that the claimed subject matter can be implemented with various operating systems or combinations of operating systems.

A user enters commands or information into the computer 202 through input devices 226. Input devices 226 include, but are not limited to, a pointing device (such as a mouse, trackball, stylus, or the like), a keyboard, a microphone, a gesture or touch input device, a voice input device, a joystick, a satellite dish, a scanner, a TV tuner card, a digital camera, a digital video camera, a web camera, or the like. The input devices 226 connect to the processing unit 204 through the system bus 208 via interface port(s) 228. Interface port(s) 228 include, for example, a serial port, a parallel port, a game port, and a universal serial bus (USB). Output device(s) 230 may also use the same types of ports as input device(s) 226. Thus, for example, a USB port may be used to provide input to the computer 202 and to output information from the computer 202 to an output device 230.

An output adapter 232 is provided to illustrate that there are some output devices 230 like monitors, speakers, and printers, among other output devices 230, which are accessible via the output adapters 232. The output adapters 232 include, by way of illustration and not limitation, video and sound cards that provide a means of connection between the output device 230 and the system bus 208. It can be noted that other devices and/or systems of devices provide both input and output capabilities, such as remote computer(s) 234.

The computer 202 can be a server hosting an event forecasting system in a networking environment, such as the networking environment 100, using logical connections to one or more remote computers, such as remote computer(s) 234. The remote computer(s) 234 may be client systems configured with web browsers, PC applications, mobile phone applications, and the like. The remote computer(s) 234 can be a personal computer, a server, a router, a network PC, a workstation, a microprocessor based appliance, a mobile phone, a peer device or other common network node and the like, and typically includes many or all of the elements described relative to the computer 202. For purposes of brevity, the remote computer(s) 234 is illustrated with a memory storage device 236. Remote computer(s) 234 is logically connected to the computer 202 through a network interface 238 and then physically connected via a communication connection 240.

Network interface 238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 240 refers to the hardware/software employed to connect the network interface 238 to the system bus 208. While communication connection 240 is shown for illustrative clarity inside computer 202, it can also be external to the computer 202. The hardware/software for connection to the network interface 238 may include, for example, internal and external technologies such as mobile phone switches, modems including regular telephone grade modems, cable modems and DSL modems, ISDN adapters, and Ethernet cards.

Licensing System

Figure 3A:
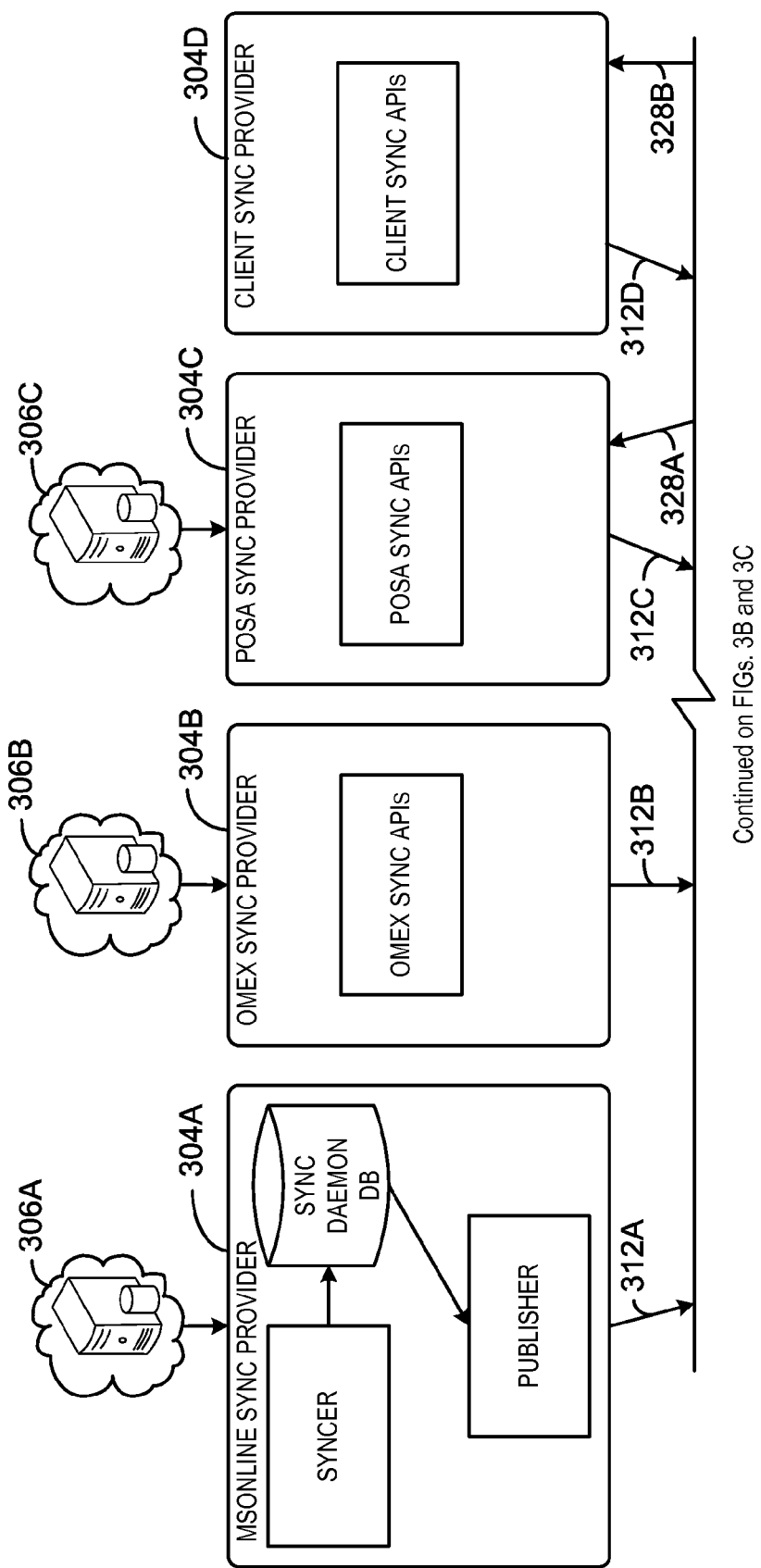
Figure 3C:
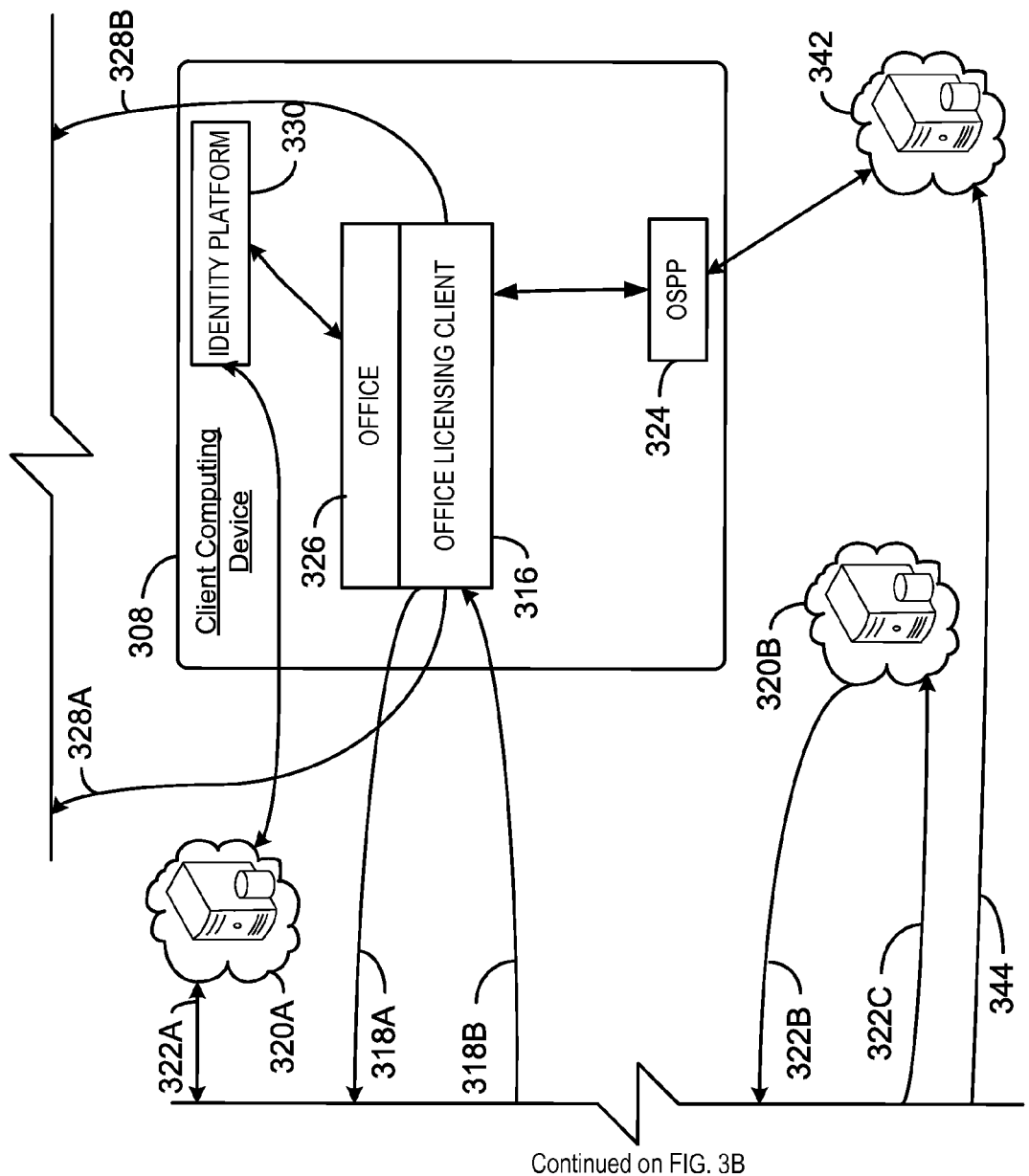

FIGS. 3A, 3B, and 3C show a schematic of a licensing system 300 that may be used to manage licenses for applications. The licensing system 300 is described with respect to an Office Licensing Service (OLS) 302 that is used to manage licenses for Office applications, or applications that are available through Office. However, it is to be understood that the licensing system 300 may also be used to manage any other suitable types of applications or services.

The licensing system 300 may include a number of sync providers 304A-D. The sync providers 304A-D are pluggable components that allow for extensibility of the licensing system 300 without modification of the OLS 302. The sync providers 304A-D may allow a number of commerce partners to interact with the OLS 302. For example, as shown in FIG. 3A, a Microsoft Online (MSOnline) sync provider 304A may allow for interaction between the OLS 302 and a MSOnline partner 306A. An Office Marketplace Experience (OMEX) sync provider 304B may allow for interaction between the OLS 302 and an OMEX partner 306B. A Point of Sale Activation (POSA) sync provider 304C may allow for interaction between the OLS 302 and a POSA partner 306C.

In addition, a client sync provider 304D may allow for interaction between the OLS 302 and a client computing device 308. The client computing device 308 may be any suitable type of computing device, such as a desktop computer or laptop computer, that can be licensed to user a particular application or service via the licensing system 300 using the OLS 302. Furthermore, any number of new commerce partners may also be integrated into the licensing system 300 using any number of additional sync providers.

As shown in FIG. 3A, each sync provider 304A, 304B, 304C, and 304D may include one or more components for performing the actions requested by the respective partner 306A, 306B, 306C, and 308D. In addition, each sync provider 304A, 304B, 304C, and 304D may interact with one or more provisioning application programming interfaces (APIs) 310 within the OLS 302, as indicated via arrows 312A, 312B, 312C, and 312D, respectively. The provisioning APIs 310 are used by the OLS 302 to perform provisioning actions. Sources calling the provisioning APIs 310, such as the sync providers 304A-D, are generally assumed to be trusted sources.

OLS APIs

The OLS 302 may include a number of OLS APIs 314, which are used to retrieve information from the OLS 302, as well as to send and receive information from the client computing device 308. The OLS APIs 314 may be called by an Office Licensing Client (OLC) 316 of the client computing device 308, as indicated by arrows 318A and 318B. The OLS APIs 314 may also be called by any services or websites 320A and 320B that desire to send or obtain machine or licensing information from the OLS 302, as indicated by arrows 322A, 322B, and 322C. The OLS APIs 314 may perform actions such as checking the provisioning status of a product key or a user, or retrieving a product key, for example.

In some embodiments, there are two sets of OLS APIs 314, including a public version that is accessible through the internet and is called by the OLC and a private version that is accessible only by certain trusted partners and is called by those partners. The main difference between the public version and the private version of the OLS APIs 314 is that the private version may accept a passport unique ID (PUID) as an identity rather than user credentials, and the private version may be implemented as a different end point using different servers than the public version.

The OLC 316 of the client computing device 308 is a client-side component that handles client-side licensing functions such as communicating with the OLS 304, activating a license via OSPP 324, interfacing with the UI, and providing authorization for Office 326 to run on the client computing device 308. The OLC 316 may also send information to the POSA sync provider 304C and the client sync provider 304D, as indicated by arrows 328A and 328B, respectively. For example, the OLC 316 may push data relating to the license of the client computing device 308 into the client sync provider 304D.

In various embodiments, the OLC 316 also communicates with an identity platform 330. The identity platform 330 may include information relating to the identity of the user, such as the user's Office Marketplace ID, i.e., Live ID. Such information may be used to activate Office 326 on the client computing device 308.

The OLC 316 may recognize whether the user, or client, activated Office 326 using a Live ID or a BPOS ID. This may enable the use of context specific user interfaces. For example, the Live ID UI may be different from the BPOS UI. In addition, the OLC 316 may be able to determine which UI to display to the user according to the download location or the CD used to install Office 326.

The OLS 302 may include a product key cache service 332 and a product key cache 334. The product key cache 334 may be a regularly replenished cache of product keys that are used by the OLS 302. The product key cache service 332 may be configured to retrieve product keys from a product key storage database 336, as indicated by arrow 338.

The OLS 302 may also include a deprovisioning service 340. The deprovisioning service 340 may be an asynchronous service that checks for deprovisioned product keys in OLS via communication with an Activation Verification System (AVS) 342, as indicated by arrow 344. The deprovisioning service 340 may also periodically deactivate licenses that are associated with deprovisioned product keys via the AVS 342.

The licensing system 300 may also include a fraud detection system 346. The fraud detection system may include a fraud detection service 348 and a fraud detection database 350. The fraud detection service 348 may sync relevant data into the fraud detection database 350 from a licensing store 352 of the OLS 302 on a regular basis. The fraud detection service 348 may obtain the data from the licensing store 352 via a data access layer 354 of the OLS 302, as indicated by arrow 356. The fraud detection service 348 may then analyze the data separately from the OLS 302, thus reducing the load on the OLS 302. In various embodiments, implementing the fraud detection system 346 separately from the OLS 302 also allows for upgrading of the components of the fraud detection system 346 without altering the OLS 302.

Use of Licensing Service for Office

This section provides several exemplary embodiments of the use of the licensing service (or OLS) described herein for Office or, more specifically, Office 2013 (also known as Office 15). In Office 2013, the OLS may support a variety of licensing models, such as Business Productivity Online Suite (BPOS) subscriptions, wherein the term "BPOS" is used interchangeably with Microsoft Online and Microsoft 365, and consumer subscriptions. The OLS may also support classic perpetual licensing, trial licensing, and keyless, i.e., credential based, licensing, as well as conversions between the various models. Furthermore, the OLS may support these different models in the context of different delivery methods, such as Original Equipment Manufacturer (OEM) preload, CD, and Electronic Software Distribution (ESD).

The various licensing models to be supported by the OLS in Office 2013 are key business priorities for Office 2013. A single system that can handle all of these various models may reduce the overhead and the complexity of Office 2013.

BPOS Scenarios

BPOS scenarios are scenarios that are focused on business. Such scenarios typically involve an administrator (admin), and the resulting licenses are typically associated with an organization instead of an end user. Therefore, the admin may be able to take a license away from one user and assign it to another user within the organization. Furthermore, BPOS scenarios may include subscriptions only.

The following is an explanation of several exemplary embodiments of subscription purchasing and provisioning for BPOS scenarios. According to such embodiments, the owner of a company purchases BPOS and an Office subscription with eight user licenses as part of BPOS for his employees. The information technology (IT) admin for the company creates an account including BPOS credentials for each of the eight employees. The IT admin then provisions a user license for Office for each of the employees.

User with a Single Machine

An employee receives an email from the IT admin informing her that she can now use Office 2013. The email has a link to Office.com, which provides information about products and services that are available for her use. The employee clicks on the email link, is asked to sign in with her BPOS credentials, and sees a link to launch Office 2013. The employee clicks on the link, and Office 2013 starts momentarily. When Office 2013 launches, the employee is asked to verify her credentials to activate Office 2013.

User with Multiple Machines

When the employee visits Office.com, she learns that the subscription permits installation of Office 2013 on up to two machines. Thus, the employee signs in to Office.com from a second machine and uses the same procedure to install and launch Office on the second machine.

Although the employee knows that she is only entitled to use Office on two machines, she decides to see what happens if she tries to install and run it on a third machine. The employee follows the same procedure, and Office launches. This time, however, the employee is informed by Office that she has already used her license on two other machines. The employee is presented with a list of the machines on which she has installed Office, and is prompted to remove her license from one of the other machines to continue. Instead of selecting a machine to remove from the list, she decides to cancel. The employee may still be able to use the Office installation on the third machine for a certain number of days, because the subscription license may allow for a grace period. If the employee had chosen to remove her license from one of the existing two machines, the license on that machine would have been removed, and she would have been able to activate her license on the third machine.

Deprovisioning User

A few months later, the employee takes a temporary leave. The owner decides to hire a temporary contract worker to fill in while the employee is on leave. Before the contact worker's first day of work, the company's IT admin deactivate the employee's BPOS account, creates an account for the contract worker, and provisions the contract worker for Office.

On the contract worker's first day of work, he is given the employee's computer and the account that was created for him Upon starting Office, the contract worker is informed that the current Office license on his machine has lapsed, and that he may provide another account to continue using Office. The contract worker enters his account information and is able to use Office normally. If the contract worker had not provided his account, there may still have been a grace period during which he could have continued using Office.

Subscription Renewal

After nearly a year has passed, the owner of the company receives a renewal notification email. The owner decides to extend the subscription for another year. The owner visits Office.com to renew the subscription. Meanwhile, the employees may experience uninterrupted use of Office.

Large Enterprise Scenarios

Large enterprise scenarios are essentially the same as BPOS scenarios. However, large enterprise scenarios may include a federation setup that allows a user to activate Office with his domain credentials, possibly even using silent authorization if they are currently signed into their domain.

The following is an explanation of several exemplary embodiments of subscription purchasing and provisioning for large enterprise scenarios. According to such embodiments, a supply manager for the company travels frequently for work. He is sometimes without his computer and borrows what he can from his suppliers. He was one of the employees that the IT admin of company had provisioned for Office.

User Roams Office Applications to an Unknown Machine

On the supply manager's trip to another company, he forgets his laptop. However, he desires access to a spreadsheet he was working on. Fortunately, he remembers that the company's Office subscription allows him access to Office from anywhere at any time. The supply manager borrows a laptop from an IT manager at the other company and logs into Office.com. Through Office.com, the supply manager is able to launch Excel for temporary use, and is able to retrieve the spreadsheet. At the end of the day, the supply manager returns the laptop to the other company.

Upon receiving the laptop, the IT manager of the other company is surprised to find no traces of the supply manager's spreadsheet or Office on the laptop. This is due to the fact that the number of times Office can be opened per day is monitored and limited to prevent fraud.

The supply manager may be prompted for his credentials when launching Excel, or they may be remembered by Office.com. Office.com may know whether or not the supply manager has Office on the machine he is currently using. The BPOS website may have choices for the supply manager to provision the particular machine, or to use Office on the machine temporarily. In some cases, Office may remain on the machine. However, when the IT manager of the other company boots Office, he is prompted for credentials before being allowed to use Office.

Subscription Upgrade from Office 2010 to Office 2013

The company has been using a BPOS Office 2010 (or Office 14) Subscription for a few years, and the owner is very happy with it. A few days ago, the owner received an email alerting him and the IT admin that Office 2013 is available for upgrade as part of the company's subscription. The owner is also informed that his current installations of Office 2010 will continue to work, but only for another year.

The IT admin goes to the BPOS administrator website and upgrades the company's employees to Office 2013. Each employee then receives an email with instructions to download Office 2013.

The supply manager receives the email and clicks on a link to Office.com from the email. He is asked to sign in with his BPOS credentials, and sees a link to launch Office 15. He clicks on the link, and Office starts momentarily. When Office launches, he is asked to verify his credentials in order to activate Office. The company's accountant, on the other hand, ignores the email and continues to use Office 2010. In one year, the accountant's installation of Office 2010 stops working, while the supply manager's installation of Office 2013 continues to work.

Office Market Place (OMEX) Scenarios

OMEX scenarios are focused on end users. According to such scenarios, the end user purchases Office via Office.com or via the backstage of Office 2013. Such scenarios can include both perpetual and subscription licenses. The licensing user interface (UI) may be able to determine whether a user is associated with a BPOS scenario or an OMEX scenario, and may display the appropriate UI.

User Upgrades from Legacy Version of Office Through Office.com

The following is an example of a scenario in which the user upgrades from a legacy version, i.e., an existing version, of Office through Office.com. A user has been using Office 2010 Home and Student on his computer and would now like to purchase the latest version. The user goes to Office.com and is offered a selection. The user decides to buy a subscription. After creating a Live ID and paying for the subscription, the user launches Office 2013. A warning appears on the screen to alert the user that he has an older copy of Office on his machine. After the user confirms that he wishes to continue, Office 2010 is safely uninstalled, and the new version launches. The user is prompted for the credentials with which he bought the subscription. The user enters his credentials and is able to use Office normally.

In some embodiments, Office 2013 presents the user with a choice of whether to download/install Office 2013 or launch Office 2013. Credentials may be remembered and automatically passed from the Internet to Office 2013 such that no prompt for credentials is imposed on the user. For example, the actual Product key may be inserted into the file name if the site of the download is secured. However, it may be desirable to force the user to sign-in to verify their credentials even if the credentials can be passed. In some cases, it may be assumed that users buying from Office.com have a Live ID. The product key may be backed up on the user's legacy copy of Office.

User Purchases Office Subscription License Through Office.com

This scenario is the same as the scenario in which the user upgrades from a legacy version of Office through Office.com, except there is no warning regarding a legacy version of Office because there is no legacy version on the machine. In various embodiments, the user is not asked for his credentials after the initial activation of the particular machine. Rather, subsequent activations are done through MachineKey.

User Purchases Office Perpetual License Through Office.com

This scenario is the same as the scenario in which the user upgrades from a legacy version of Office through Office.com, except there is no warning regarding a legacy version of Office because there is no legacy version on the machine. The user may or may not be able to see the product key, depending on the specific instance. The user may be allowed to activate the perpetual license using his log-in information. Transfer scenarios may be handled in a number of different ways, depending on the specific instance. For example, if the user wants to sell his Office to another user, he may have to give his credentials to the new user, or gifting may be supported.

User Updates Office Subscription on First Computer from Second Computer Through Office.com when User Owns Office Subscription on First Computer According to this scenario, a user purchases Office 2013 Home and Student subscription and installs it on his desktop and on his laptop. The user decides to upgrades to Office 2013 Professional. From the desktop, the user goes to Office.com and upgrades the subscription. In Office.com, the computers currently on his Office 2013 Home and Student subscriptions are listed, and the user is informed that those computers will be automatically updated to Office 2013 Professional if the computers have internet access when the user launches Office on those computers. The user is also given a link to upgrade the desktop now. The user clicks on the link immediately and provides his credentials. Office then upgrades to Office 2013 Professional on the desktop.

A few days later, the user launches Word on his laptop. When Word launches, the user is informed that a licensing change has taken place, and the user is given a choice to upgrade now to Office 2013 Professional, to upgrade later, or to remove this machine from the subscription. The user decides to upgrade later. A day later, the user again launches Word and is given the same choices. The user decides to upgrade at that point in time.

In various embodiments, the user may be able to update the desktop via Office.com if he is using Office.com on the desktop. In some cases, the user may also be allowed to choose an "upgrade later" choice. In other cases, the upgrade may be forced immediately. If "upgrade later" is allowed, the user may be allowed to select that choice a specific number of times before the upgrade is forced. The user may be prompted to enter credentials on update now or remove actions.

User Updates Office Subscription on First Computer from Second Computer Through Office.com when User Does Not Own Office Subscription on First Computer According to this scenario, a user purchases Office 2013 Home and Student Subscription and installs it on his desktop. The user buys a used laptop from a friend. His friend's Office 2013 Professional subscription is running on the used laptop. The user is able to use Office normally on the used laptop. The user's friend remembers that he forgot to remove his Office 2013 Professional subscription from the laptop, so he goes to Office.com and removes the laptop from his subscription.

Upon starting Office the next time, the user is informed that the current Office license on his machine has been removed, and that he may provide another account to continue using Office. The user may then enter his credentials in order to use the version of Office that is supported by his subscription.

User Updates Office License from Subscription License to Perpetual License on First Computer from Second Computer Using Office.com when User Owns Office Subscription on First Computer This scenario is the same as the scenario in which the user updates the Office subscription he uses on the first computer from the second computer through Office.com when the user owns the subscription on the first computer. However, instead of upgrading to another subscription license, the user simply upgrades to a perpetual license.

User Updates Office License from Subscription License to Perpetual License on First Computer from Second Computer Through Office.com when User Does Not Own Subscription on First Computer This scenario is the same as the scenario in which the user updates the Office subscription he uses on the first computer from the second computer through Office.com when the user does not own the subscription on the first computer. However, instead of upgrading to another subscription, the user upgrades to a perpetual license.

User Changes Office License from Perpetual License to Subscription License on First Computer from Second Computer Through Office.com when User Owns Perpetual License on First Computer The user has Office Home and Student on a first computer. However, the user discovers that he has a desire for a larger selection of Office products. The user logs on to Office.com from a second computer to purchase Office Professional Subscription. At the end of the purchase, the user is given a link to download Office Professional and directions on how to update a currently installed version of Office.

The user logs onto Office.com again on the first computer and clicks on the download link. The copy of Office on the first computer is updated to Office.com Professional. If the user had not revisited Office.com, he could have performed the update via going to the backstage on his currently installed Office Home and Student. For example, the user may click on a button for updating the license or checking for updates.

The user later cancels his subscription. The Professional subscription on the first computer eventually lapses and reverts back to Office Home and Student.

Licensed User Different from Current User

A small business owner has three employees. He would like each of his employees to use Office. After reviewing the subscription offers on Office.com, the owner realizes that each subscription includes an entitlement to use Office on two different machines. However, the owner realizes he can only have one subscription at a time. Thus, he asks one of the employees to also purchase a subscription, which he then separately expenses. The owner and one of the employees download Office on their respective computers and activate it using the owner's credentials. The two other employees download Office on their respective computer and activate it using the employee's credentials. To personalize Office, the employees are still able to log in with their own ID and use it normally.

In some embodiments, it may be assumed that each user can only have one Office subscription. However, in some cases, a user may have a subscription for Office Home and Student, as well as a subscription for Office Professional. Also, a user may have multiple versions of the same subscription, or multiple perpetual licenses.

User Converts from Subscription License to BPOS License

A small business owner has three employees. The owner and one of the employees both have Office Professional subscriptions that allow installation of Office on up to two machines. The other two employees are each using one of the subscriptions to install Office on their machines.

The owner has recently hired five new employees. Upon reading information online, he decides that a BPOS subscription will better fit his desires. The owner goes to Office.com and converts his subscription to a BPOS subscription, purchasing nine licenses (enough for everyone at the company).

The owner creates and gives BPOS accounts to each of his employees and provisions each for Office. When each employee launches Office, he is informed that the license currently on his machine is no longer valid and that he may provide another account in order to continue using Office. Thus, each employee may enter their BPOS ID, and then use Office normally. Further, in some embodiments, a grace period is provided if an employee does not provide another account immediately.

User Converts from Perpetual License to BPOS License

A small business owner has ten employees. The owner had purchased perpetual licenses of Office Home and Business for each employee's machine. However, upon reading information online, the owner decides that a BPOS subscription with Office Professional Plus will better fit his desires. The owner goes to Office.com and purchases a BPOS subscription with eleven licenses (enough for everyone at his company). The owner creates and gives BPOS accounts to each of his employees and provisions each for Office.

Each employee is given directions from the owner to go to their BPOS home page to download the Office subscription. Alternately, they are also given directions on how to change their license from the backstage. If the employees take no actions on their current machines, their machines will continue to run whatever perpetual license is currently on their machine, even if they sign in with their BPOS ID.

User Cancels Subscription Through Backstage

A user has a basic Office subscription package but desires a larger selection of Office products. The user goes into the backstage and selects "My Account". The user selects "Manage My Subscription" and upgrades his bundle to one which contains the products he desires. When he no longer desires the additional products, the user goes to "My Account" under the backstage and cancels his subscription. The user's copy of Office returns to a reduced functionality mode, or whatever license he had before he upgraded his bundle.

User Cancels Subscription Through Office.com

A user has a basic Office subscription package but desires a larger selection of Office products. The user logs on to Office.com to manage his current subscription. The user upgrades his bundle to one which contains the products he desires. When the user no longer desires the added products, he logs in to Office.com and cancels his subscription. His copy of Office returns to a reduced functionality mode that was supported by his previous license.

User Purchases Both Perpetual License and Subscription License

A user has Office Starter on his laptop. The user signs into Office Marketplace with his Live ID, and buys Office via the backstage using his laptop. Office Starter is upgraded to the Subscription package.

Later, the user returns to Office Marketplace via a web browser in order to buy a perpetual license. The user does not have to re-enter his payment details. Instead, Office Marketplace remembers his credentials. After the user confirms the purchase, he downloads and launches Office on the laptop.

A few months after he purchases Office, the user gets a virus on his laptop, and his applications are to be reinstalled. The user logs onto the Office Marketplace in order to re-download his copy of Office and his license. This may be accomplished using the same product key.

Subscription Renewal

If the user has an Office subscription, he may automatically renew the subscription. The user may experience uninterrupted use of Office.

Subscription Lapses

A user has an Office Subscription. However, he does not care for the service and decides to let it lapse when it expires. The billing system sends the user numerous emails, which he ignores. Throughout this time, the user continues to use Office. He is notified through Office at some point that his subscription has expired, and that he may manage his subscription from the backstage. He ignores these warnings, and eventually, Office stops functioning on his computer.

Subscription Upgrade from Office 2013 to Next Version of Office

A user has an Office Subscription for Office 2013 and currently has Office 2013 installed on his computer. A few years have passed, and the next version of Office has been released. The next time the user launches any Office application, he is notified that he can upgrade to the new version of Office. The user is also notified that he can do so at any time from the backstage. The user decides to upgrade now. The new version of Office is installed on the user's computer.

In some embodiments, a number of components may notify users that a new version of Office is out, such as OMEX or Office Licensing Client (OLC), or both. In some cases, the amount of time the user has left to upgrade to the next version may be tracked. At some point, an upgrade may be forced, and the old version may become unusable. Keys may come from correct tax locations. The same logic may be used as for BPOS offers.

Retail/OEM/CD Scenarios

These scenarios are focused on traditional retail channels. A common theme in these scenarios is that the user starts with a product key. For example, a product key is often includes in the box when the user purchases Office.

User Purchases Office from Retail Store

A user goes to a retail store and purchases a box copy of Office Home and Student. Inside the box is a CD as well as a product key. The user installs Office from the CD. As part of the installation process, the user is prompted to enter his product key. The user is also prompted to sign into Office, and after doing so, he is given an opportunity to associate his license with his Live ID. After a few months, the user finds a virus on his computer. The user reformats the computer and reinstalls Office. Unfortunately, the user lost the Product Key. However, the user is able to activate Office using only his Live ID. The OLS may return the product key that is associated with this Live ID.

User with Multiple Machines

A user has four computers at his house. The user had purchased a copy of Office from a retail store and was able to successfully activate Office on the first computer with the product key. Since he associated the license with his Live ID when setting up his first computer, the user was also able to activate Office on the second and third computers using his Live ID. However, upon trying to activate the fourth computer, the user receives an error message informing him that his license only supports three computers.

User Associates Office License with Live ID

In general, if the user desires to associate his product key with his Live ID, he may enter the full 5×5 product key into Office Marketplace online. Via Office Marketplace, the OLS may then associate the product key with the user's Live ID.

The user may view the Office licenses that are associated with his Live ID online through Office.com, or through the backstage. In addition, the user may be able to disassociate a product key from his Live ID through Office.com, or through the backstage. When the user attempts to use his Live ID for activation again, he is unable to do so. However, computers that have already been activated with his Live ID will function as normal.

Trial Scenarios

These scenarios are directed to trial licenses and are essentially the same as the non-trial subscription scenarios. However, the license period is much shorter for trial scenarios.

User Initiates Trial License Through Office.com

A user has been using Office Starter. The user decides to give Office a try and, after providing his Live ID, downloads a trial license from Office.com. Upon launching Office on his machine, the user is prompted to enter his Live ID. Once the user enters his Live ID, he is able to start using Office.

User Initiates Trial License Using Product Key

A user has obtained a trial copy of Office. The trial copy of Office includes a product key that is associated with a trial license. The user installs Office and uses the product key to activate Office.

Trial License Lapses

A user has been using Office Starter and now desires to try out Office. After providing his Live ID, the user downloads a trial license from Office.com. As time passes, the user is notified from the OLC that his trial will expire soon. The user decides to let his trial license lapse. When his trial license expires, Office reverts back to Office Starter.

User Converts from Trial License to Subscription License

Dan has been using a trial of Office he downloaded from Office.com. As time passes, he is notified from the Office client that his trial will expire soon. Dan had a good experience using Office 15 and decides to convert to a full subscription via Office.com (or the backstage). His copy of Office automatically upgrades to a full subscription with no interruption in service. If he activated trial via product key and never provided an ID, he might have to provide his ID to convert to full subscription.

Methods for Purchasing, Activating, or Reactivating License

Figure 4:
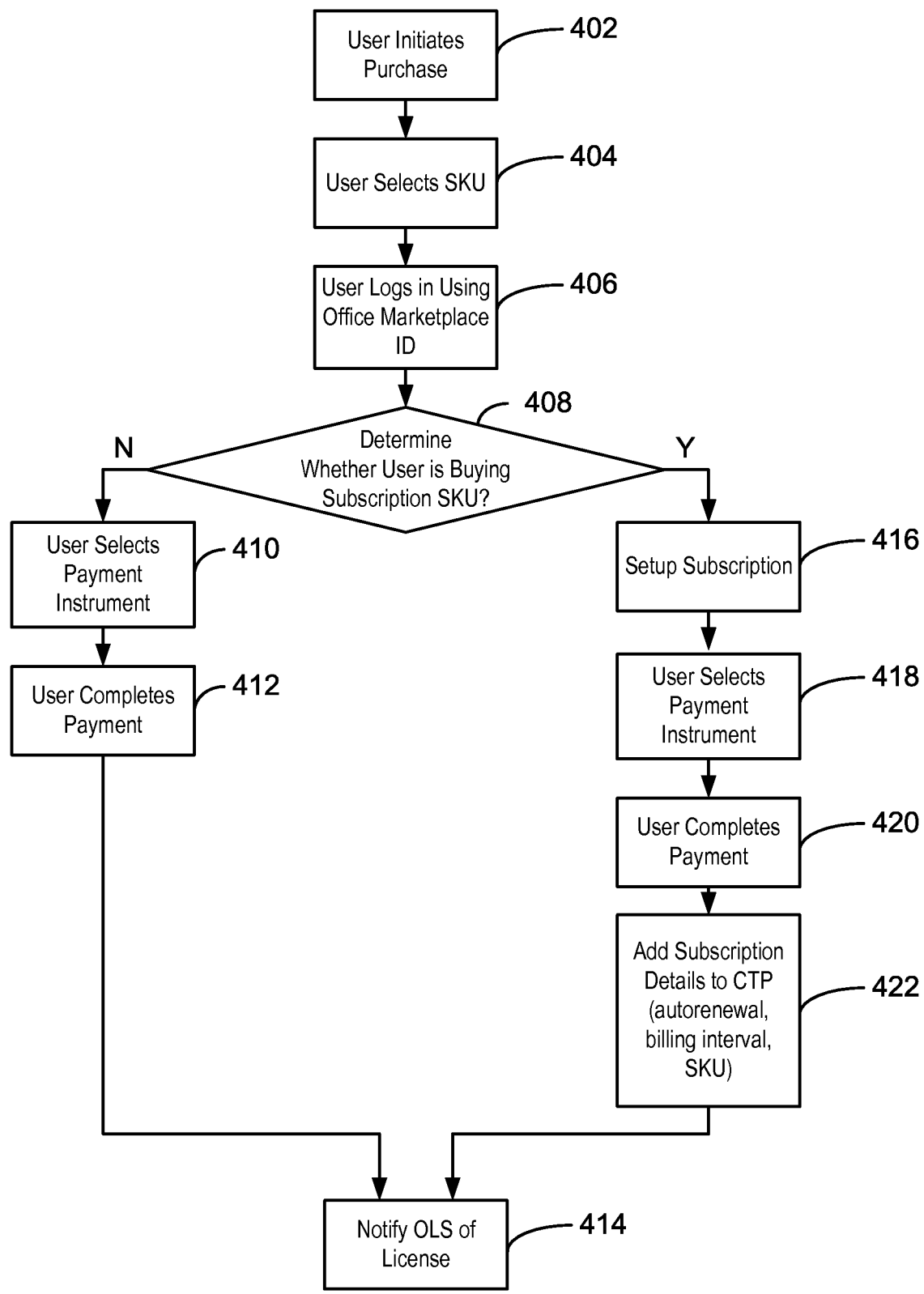
FIG. 4 is a process flow diagram of a method for purchasing a license for an application through a marketplace service.

FIG. 4 is a process flow diagram of a method 400 for purchasing a license for an application through a marketplace service. In various embodiments, the marketplace service is the Office Marketplace Experience (OMEX). Further, in some embodiments, the method 400 is implemented via the licensing system 300 discussed above with respect to FIGS. 3A, 3B, and 3C.

The method 400 begins at block 402, at which the user initiates the purchase of a license. The user may initiate the purchase through Office Starter, Office Trial, the backstage of Office, or Office.com, for example. The user selects a store keeping unit (SKU) relating to the desired license at block 404. At block 406, the user log-ins to the Office Marketplace, e.g., OMEX, using his Live ID.

At block 408, it is determined whether the user is busing a subscription SKU. If the user is not buying a subscription SKU, the user may select the payment instrument at block 410 and complete the payment at block 412. The OLS may then be notified of the license update via the OMEX sync provider at block 414.

If the user is buying a subscription SKU, the subscription SKU may be set up at block 416. The user may then select the payment instrument at block 418 and complete the payment at block 420. At block 422, the subscription details may be recorded. For example, the SKU, autorenewal information, and/or billing interval information may be recorded. The OLS may then be notified of the license update via the OMEX sync provider at block 414.

Figure 5:
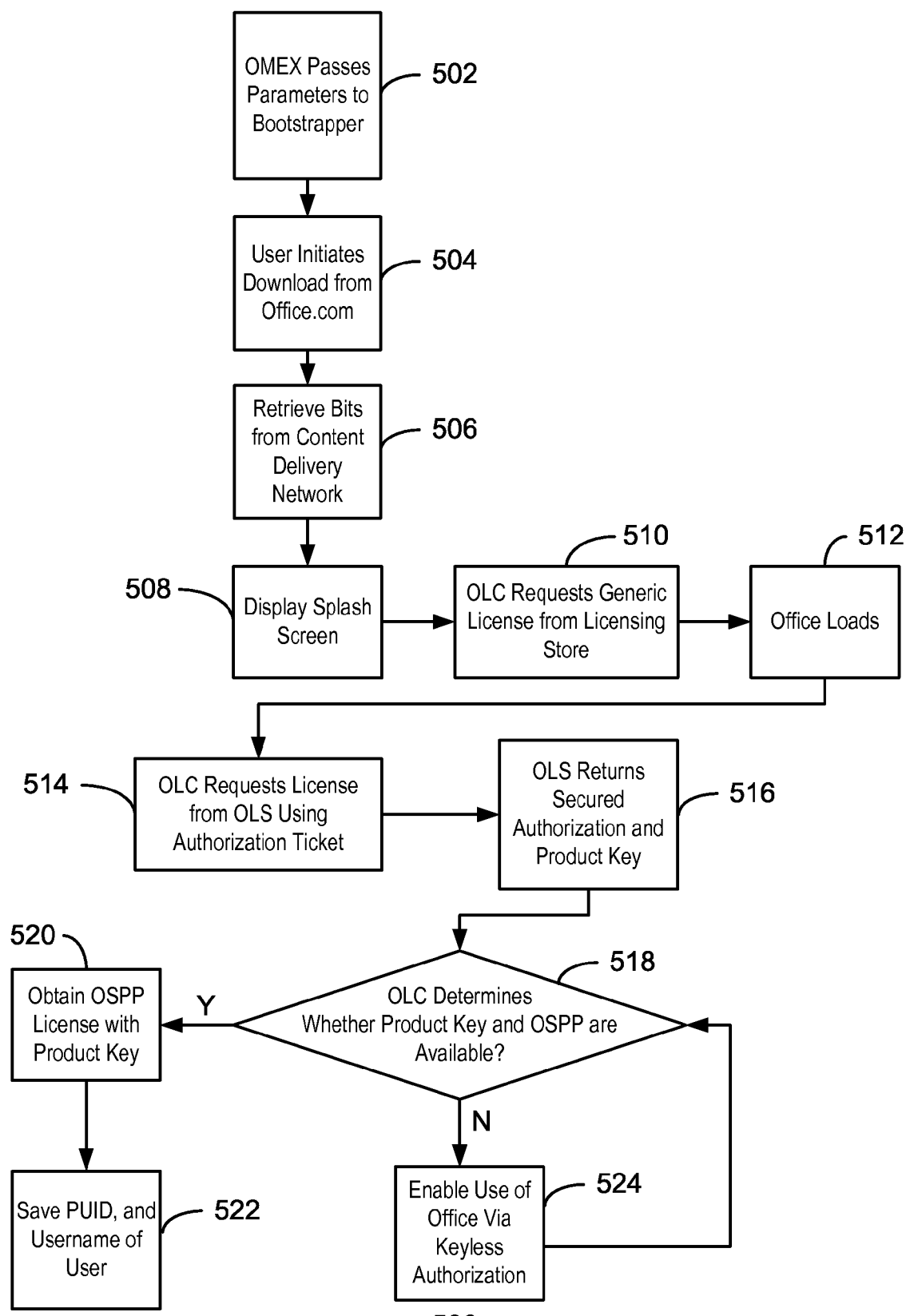
FIG. 5 is a process flow diagram of a method for the initial activation of a license for an application through a marketplace service.

FIG. 5 is a process flow diagram of a method 500 for the initial activation of a license for an application through a marketplace service. In various embodiments, the marketplace service is OMEX. The initial activation of the license may take place on one client device, e.g., one computer, and may not include upsetting. In some embodiments, the method 500 is implemented via the licensing system 300 discussed above with respect to FIGS. 3A, 3B, and 3C.

The method 500 begins at block 502, at which OMEX passes parameters, such as the authorization ticket, to the bootstrapper. The user initiates the download from Office-.com at block 504. Bits are retrieved from the content delivery network (CDN) at block 506, and a splash screen is displayed at block 508 while the bits are being retrieved.

At block 510, the OLC requests a generic license from the licensing store. This allows temporary use of Office while the license is being activated. Office loads at block 512, and the OLC requests the license from the OLS using the authorization ticket at block 514. At block 516, the OLS returns a secured authorization (or keyless authorization) and a product key (in the case of a non-roaming application scenario).

At block 518, the OLC determines if the product key and OSPP are available. If the product key and OSPP are available, an OSPP license is obtained with the product key at block 520. A passport unique ID (PUID) and username of the user are saved on the local machine at block 522.

If the product key and OSPP are not available, use of Office may be enabled via keyless authorization. The OLC may then periodically determine if the product key and OSPP are available at block 518, and may take the appropriate action if the product key and the OSPP become available.

Figure 6:
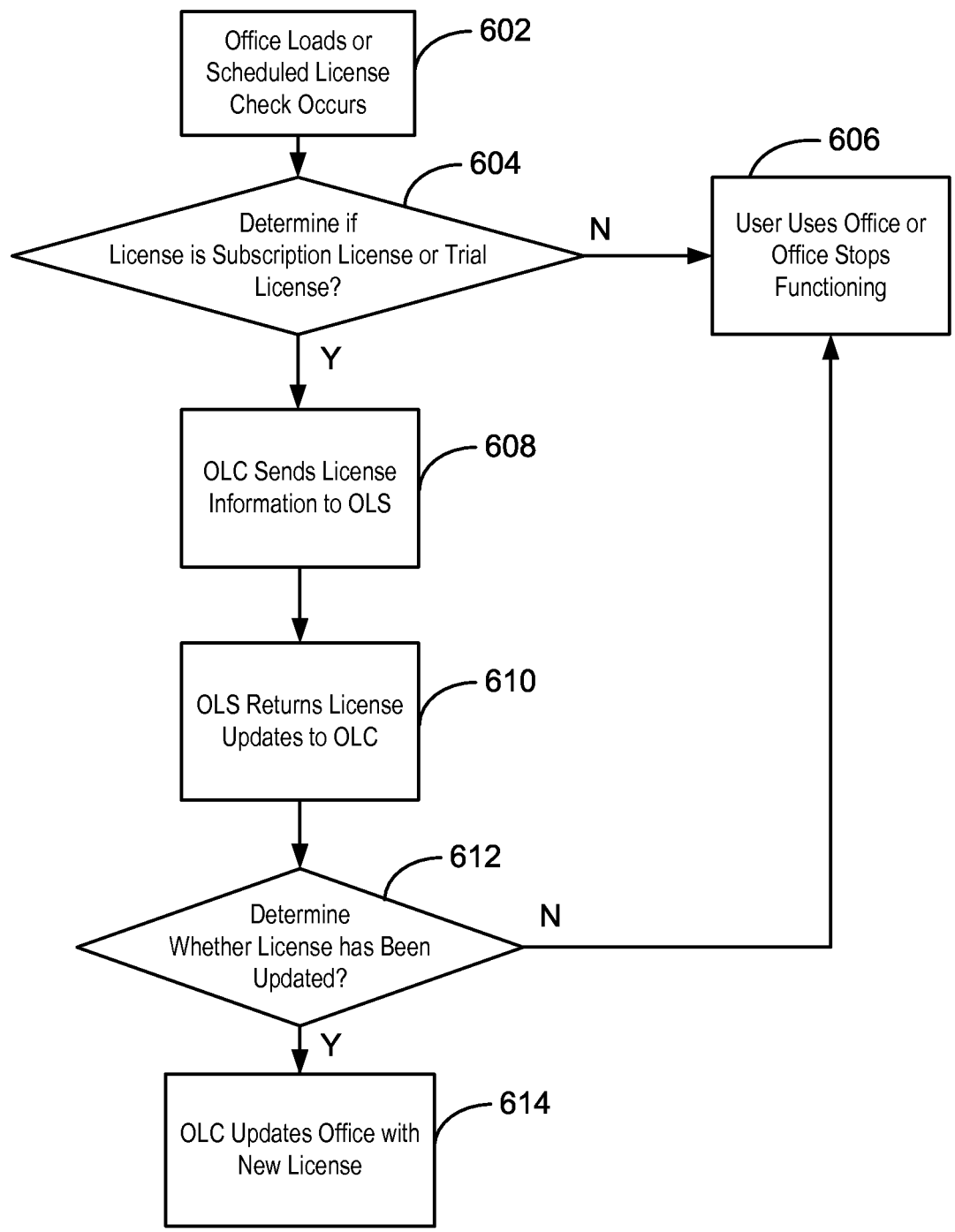
FIG. 6 is a process flow diagram of a method for the reactivation of a license for an application.

FIG. 6 is a process flow diagram of a method 600 for the reactivation of a license for an application. Such a method of reactivation may include upsetting. In some embodiments, the method 600 is implemented via the licensing system 300 discussed above with respect to FIGS. 3A, 3B, and 3C.

The method 600 begins at block 602, at which Office is loaded or a scheduled license check occurs. At block 604, it is determined if the license for Office is a subscription license or a trial license. If the license is not a subscription license or a trial license, it is determined to be a perpetual license. In this case, the method 600 continues at block 606, at which the user uses Office normally. In some cases, Office may stop functioning if the license has expired or been terminated for some reason.

If the license is a subscription license or a trial license, the OLC sends license information to the OLS at block 608, and the OLS returns license updates to the OLC at block 610. At block 612, it is determined whether the license has been updated. If the license has been updated, OLC updates Office with the new license. In some cases, the user may be presented with an option of whether the user wishes to implement the new license now or later via a UI. In addition, if the new license involves a change in the version of Office, the new version may be downloaded. Alternatively, if the license has not been updated, the method 600 may return to block 606. In this case, the license may be expired and, thus, Office may stop functioning.

Office Licensing Service (OLS)

This section describes the functioning of the OLS of the licensing system described herein, such as the OLS 302 of the licensing system 300 described above with respect to FIGS. 3A, 3B, and 3C. The OLS serves as the central hub of the licensing system. The OLS obtains provisioning data, e.g., what the user bought, from various sources, such as BPOS or OMEX. The OLS also obtains product keys, provides keyless authorization, and manages user-to-machine relationships, e.g., how many machines the user has activated.

The OLS may allow the licensing system to handle licenses for various different types of operating systems or devices. This may result in a reduction of the overhead for licensing applications. The OLS may also provide agility and flexibility with changes in the business model and provide a centralized view of user-to-license information.

In various embodiments, OMEX provides an interface for the OLC to manage machines for a user identity. OMEX also provides an interface for websites, e.g., the OMEX management website, to manage machines for a user identity. OMEX may maintain a database of IDs, licenses relating to the IDs, and the machines for which the licenses have been used. In addition, OMEX may provide the ability to obtain license keys from a key store. Further, OMEX may provide an interface by which the OLC may authorize Office usage, either via product key distribution (for cases in which OSPP is available) or via a straightforward authorization based model (for cases in which OSPP is not available, i.e., keyless authorization scenarios).

The OLS provides at least three broad classes of services, including user licensing provisioning, product key and roaming authorization retrieval, and machine management capabilities, as explained further below. With regard to user licensing provisioning, the OLS can store and retrieve information relating to the type of Office license to which the user is entitled based on information provided by partners such as BPOS and OMEX. For example, the OLS can store and retrieve information relating to whether the user is currently subscribed to Office Home and Business, or whether he has bought perpetual Office Professional.

With regard to product key and roaming authorization retrieval, the OLS has the ability to retrieve the correct product key from a keystore based on the Office license to which the user is entitled. This capability is seamless to the user and the partner. In other words, the product key is retrieved on demand when the user is trying to activate a machine, and activation is done automatically by the OLC without exposing the actual product key to the user. However, the OLS does not include the ability for partners to arbitrarily retrieve a product key. Furthermore, the OLS also has the ability to retrieve roaming authorization, i.e., keyless authorization, which enables the user to use Office in roaming application scenarios without a product key.

In some embodiments, the OLS provides machine management capabilities for subscription licenses only. In addition to simply retrieving the product key, the OLS may also manage the number of machines which have been activated, and provide a way for a user to rotate the machines that are included in his subscription. For example, if the subscription the user bought entitles him to use Office on three machines, the OLS may deprovision one of the first three machines if a fourth machine is provisioned.

The database of the OLS may be organized by users, who may have one or more entitlements and zero or more machines under each entitlement. Each entitlement is associated with one and only one offer. For perpetual entitlements with perpetual offers, a single perpetual key may be associated with each entitlement.

Figure 7:
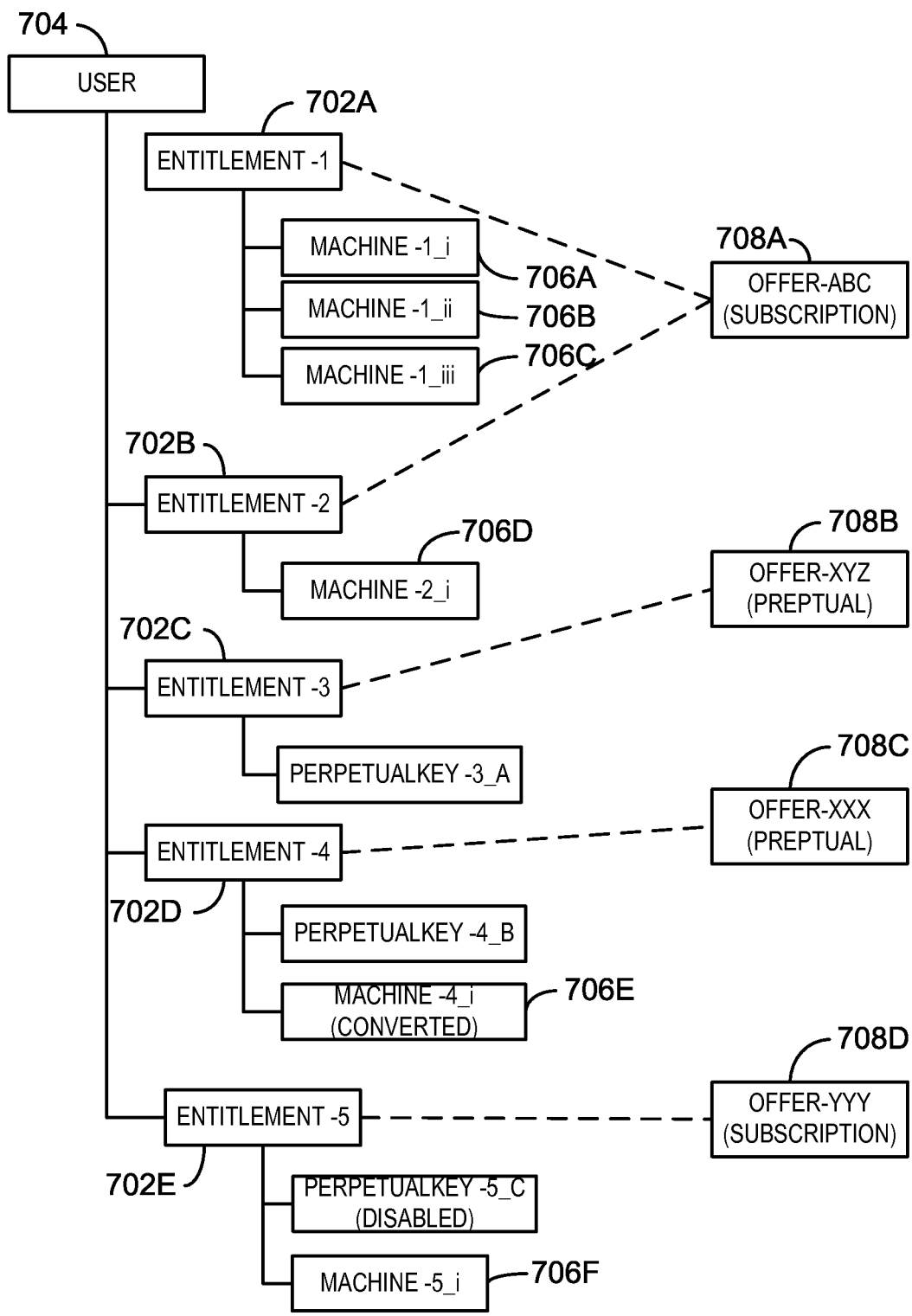
FIG. 7 is a block diagram showing a number of entitlements, or licenses, that have been licensed to a user for a number different machines.

FIG. 7 is a block diagram showing a number of entitlements, or licenses, 702A-E that have been licensed to a user 704 for a number different machines 706A-F. Each entitlement 702A-E may include an offer 708A-D relating to either a perpetual entitlement or a subscription entitlement, or both, as discussed further below.

In various embodiments, the OLS only manages machines, e.g., machines 706A, 706B, 706C, 706D, and 706F, that are provisioned using a subscription entitlement, e.g., entitlements 702A, 702B, and 702E. Therefore, users with perpetual entitlements, e.g., entitlements 702C and 702D, will not have any machines associated with the entitlements, unless the machine, e.g., machine 706E, was previously converted from a subscription entitlement.

In various embodiments, an offer represents a type of usage right that is available for purchase, for instance, through Microsoft Online or OMEX. Offers are not user specific, and are populated when the licensing system is brought online and updated. Additions and updates to offers may be incorporated as part of deployment. Each offer may be associated with an offer ID, which is a unique ID that identifies the offer. In addition, each offer may be associated with a specific type of offer. For example, the offer may be a product key only offer, i.e., an offer relating to a perpetual or trial license, or a machine management offer, i.e., an offer relating to a subscription license.

According to embodiments described herein, a license or entitlement is a specific set of usage rights. A user may have one or more entitlements. The entitlements are populated by the sync providers during provisioning. Each entitlement has a unique entitlement ID, which may be determined in part by the provisioning partner.

A variety of information relating to each entitlement may be recorded along with the entitlement. For example, the entitlement ID, the partner entitlement ID, the corresponding partner, the user ID, the offer ID, and the state of the entitlement may be recorded. In addition, values of various parameters relating to the entitlement may be recorded. For example, information relating to whether the entitlement enables roaming application scenarios, i.e., RoamingType, information relating to the user's billing country, i.e., BillingCountryISO, and information relating to the language of the entitlement may be recorded. In addition, information relating to the maximum number of provisioned or pending conversion machines allowed on the entitlement, i.e., ActiveMachineMax, information relating to the number of provisioned or pending conversion machines currently on the entitlement, i.e., ActiveMachineCount, and a variety of other information may be recorded. Parameters relating to the token for the entitlements may also be recorded. Such parameters include SecureToken, TokenUseMax, TokenUseCount, TokenExpiryLength, and TokenExpiry, among others.

A machine may be a specific installation of Office using a specific subscription entitlement. There may be zero or more machines under an entitlement. A new machine is created every time a new subscription (or TBL) product key is issued from an entitlement.

Each machine may be associated with a MachineKey, which may be used to identify the machine. The value of the MachineKey may be derived from the product key which was issued for the machine. The status of the machine, such as whether the machine is provisioned, pending conversion, converted, or previsioned, may be recorded. In addition, various other parameters relating to the machine may be recorded, including the entitlement ID, offer ID, key status, and information relating to the machine itself.

According to embodiments described herein, a product key, i.e., ProductKey, is issued for each entitlement. There may be only one enabled ProductKey under each entitlement, and only perpetual entitlements may have an enabled ProductKey. A ProductKey may be created the first time a product key is requested from a perpetual entitlement. As long as the entitlement has not been converted, the same perpetual key is used on all subsequent key requests. Information relating to the status of the product key, i.e., KeyStatus, may be recorded. The status of the product key may be enabled, pending disablement, or disabled. Information relating to the number of times the product key was issued, i.e., KeysIssuedCount, and information relating to the last date that the KeyStatus was updated, i.e., KeyStatusLastUpdate, may also be recorded along with the product key.

In various embodiments, the provisioning APIs are a set of internal APIs used for provisioning. The provisioning APIs are called by the sync providers only. Each sync provider API may call one or more of the provisioning APIs. The provisioning APIs may be designed to appear as atomic operations to the rest of the licensing system. Note that a single provisioning action may take multiple provisioning API calls. For example, for a OMEX sync provider's ProvisionUser( ) API, both AddUser( ) and CreateEntitlement( ) calls are used. If AddUser( ) succeeds but CreateEntitlementForUser( ) fails, then the user may not have an entitlement, and the user will not be granted unauthorized access to Office. Some examples of APIs within the licensing system include the AddUser( ) API, which adds a user to the OLS, the CreateEntitlement( ), which creates an entitlement for the user, and the ConvertEntitlement( ) API, which converts an Entitlement to another offer or updates the parameter ActiveMachineMax. The ConvertEntitlement( ) API functions the same regardless of whether the conversion is from a subscription license to another subscription license, or from a subscription license to a perpetual license, for example. In addition, unless explicitly specified, fraud counters and limits may not be reset during conversion.

Figure 8:
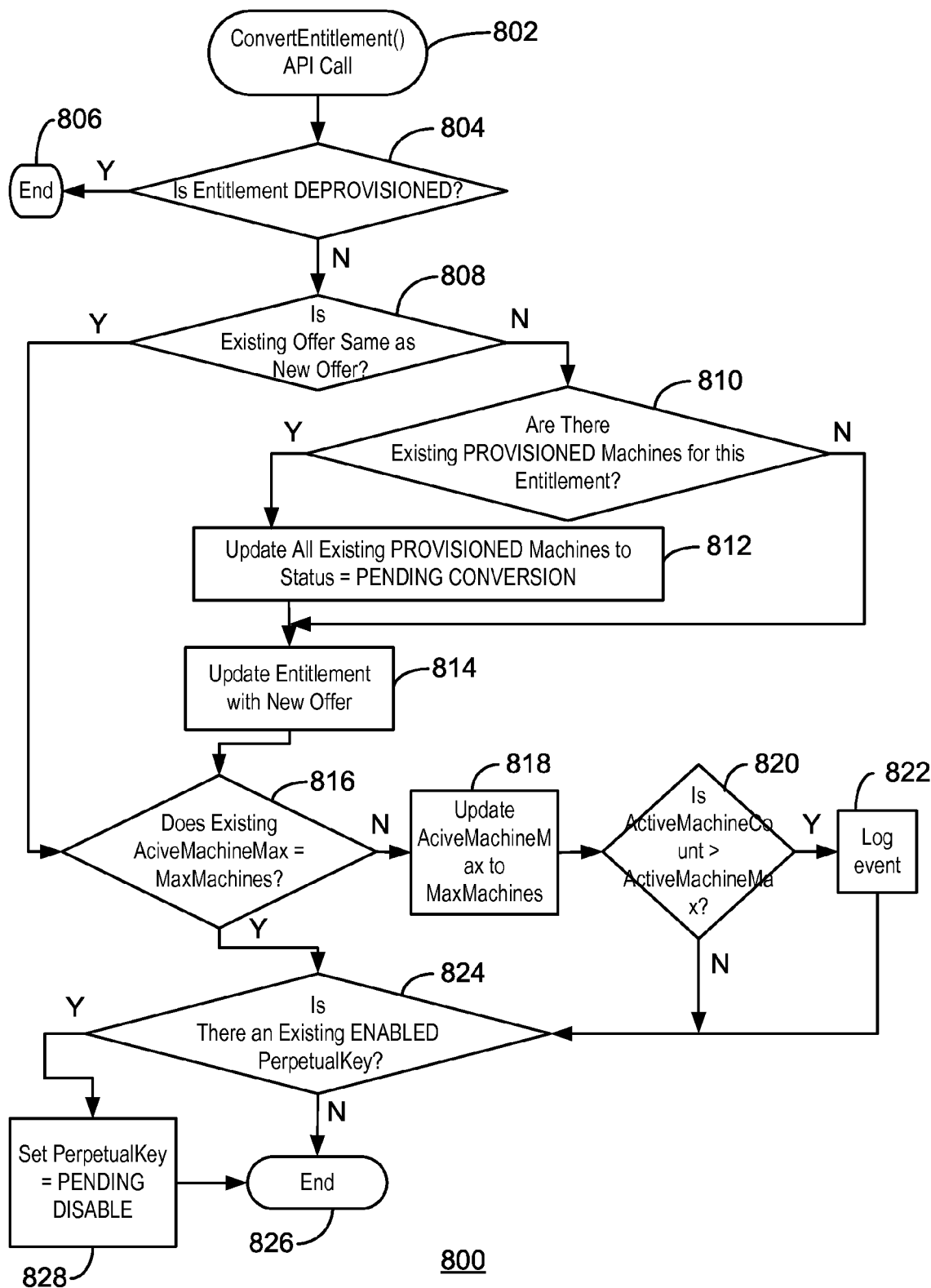
FIG. 8 is a process flow diagram of a method for converting an entitlement to another offer or updating the offer relating to the entitlement.

FIG. 8 is a process flow diagram of a method 800 for converting an entitlement to another offer or updating the offer relating to the entitlement. The updating of the offer may include, for example, updating the ActiveMachineMax. The method begins at block 802, at which the ConvertEntitlement( ) API is called. It may be determined whether the entitlement is deprovisioned at block 804. If the entitlement is deprovisioned, the method 800 ends at block 806. If the entitlement is not deprovisioned, the method 800 continues to block 808, at which it is determined whether the existing offer is the same as the new offer.

If the existing offer is not the same as the new offer, it is determined whether there are existing provisioned machines for the entitlement at block 810. If there are existing provisioned machines, all existing provisioned machines are updated to status=pending conversion at block 812. The method 800 then proceeds to block 814, at which the entitlement is updated to the new offer. If it is determined that there are no existing provisioned machines at block 810, the method 800 automatically proceeds to block 814.

At block 816, it is determined whether the existing ActiveMachineMax=MaxMachines. Further, if it is determined at block 808 that the existing offer is the same as the new offer, the method 800 may automatically proceed to block 816.

If the existing ActiveMachineMax≠MaxMachines at block 816, the ActiveMachineMax may be updated to MaxMachines at block 818. It may then be determined at block 820 whether the ActiveMachineCount is greater than the ActiveMachineMax. If the ActiveMachineCount is greater than the ActiveMachineMax, the event is logged at block 822 before the method 800 proceeds to block 824. Otherwise, the method 800 proceeds to block 824 from block 820. Further, if the existing ActiveMachineMax=MaxMachines at block 816, the method 800 automatically proceeds to block 824.

At block 824, it is determined whether there is an existing enabled PerpetualKey. If there is not an existing enabled PerpetualKey, the method 800 ends at block 826. If there is an existing enabled PerpetualKey, the PerpetualKey is set such that PerpetualKey=pending disabled at block 828 prior to the ending of the method 800 at block 826.

A number of additional APIs may also be included within the licensing system. For example, an UpdateEntitlementStatus( ) API may be used to update the status of an entitlement. An UpdateBillingCountry( ) API may be used to update the billing information of the user, i.e., BillingCountryISO, and a GetDownloadInfo( ) API may be used to return the download URL and other information relating to the entitlement.

In various embodiments, a secure token, i.e., SecureToken, is simply a globally unique identifier (GUID) generated by the OLS that grants temporary access to the entitlement as a user. When a client makes OLS calls with the SecureToken, the client is essentially calling OLS with the credentials of the user for which the token was issued. The main differences between providing an identity ticket and providing a secure token are that the secure token is scoped to a specific entitlement, so it can only be used to retrieve information or get a key for a specific entitlement, and the secure token is limited use and time bound.

A CheckMachineStatus( ) API returns the status of a machine. However, this API may only return information for machines that were provisioned under subscription entitlements. A GetEntitlementsForIdentity( ) API may return the entitlement(s) currently associated with the supplied identity.

A GetEntitlementForMachineKey( ) API may return the entitlement currently associated with the MachineKey. In some embodiments, the process flow may be as follows: (1) Retrieve EntitlementID of the machine with matching MachineKey; (2) Retrieve the entitlement with the above EntitlementID, and (3) Return information on the entitlement.

In addition, the GetKey( ) API may be the API from which the OLC can retrieve keyless authorizations and/or product keys for activation. The logic for this API can be broken down into multiple parts.

Figure 9:
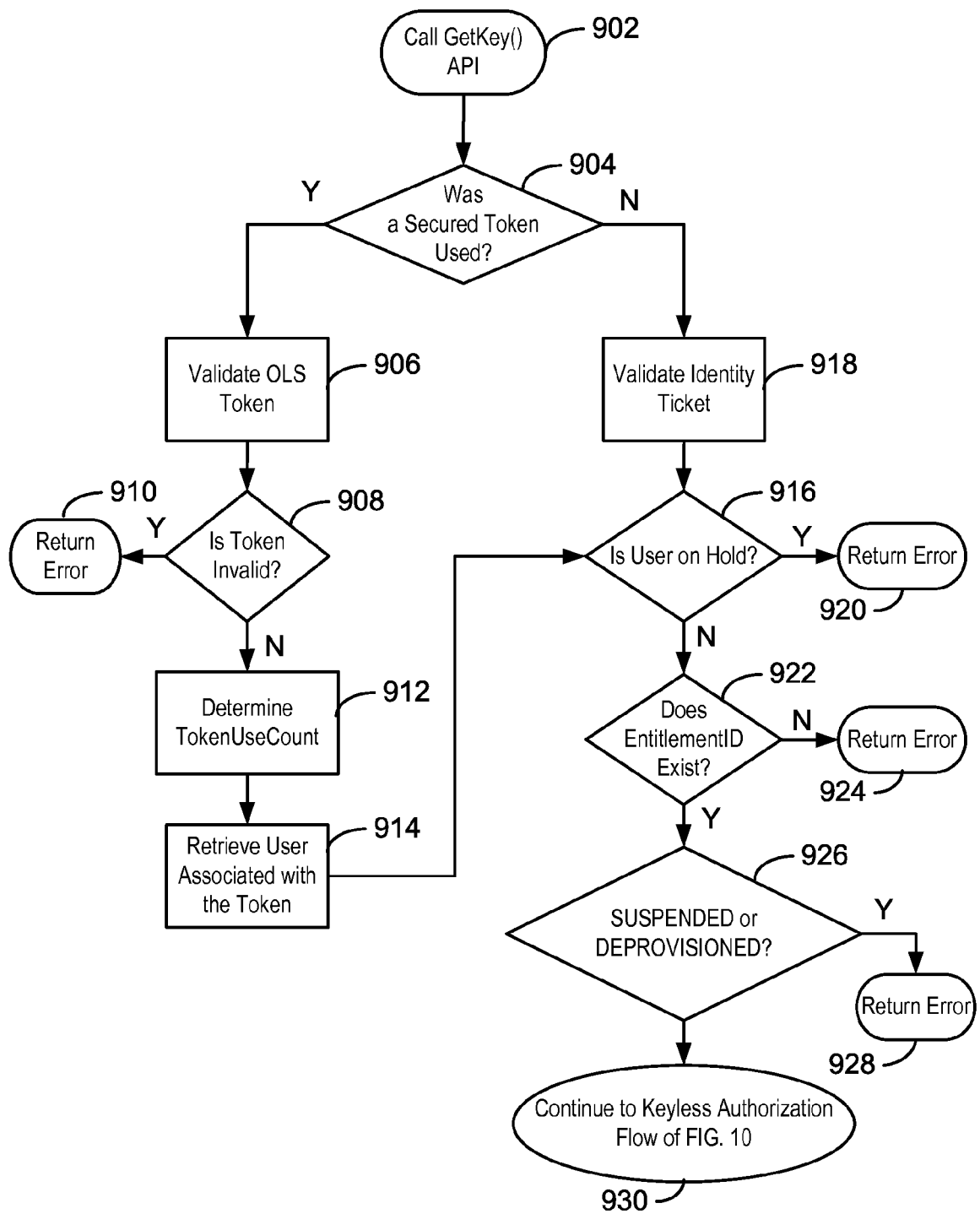
FIG. 9 is a process flow diagram of a method for verifying an identity of a user and an identity of an entitlement for which keyless authorization is to be provisioned.

FIG. 9 is a process flow diagram of a method 900 for verifying an identity of a user and an identity of an entitlement for which keyless authorization is to be provisioned. The method 900 begins at block 902, at which the GetKey( ) API is called. At block 904, it is determined if a SecuredToken was used. If a SecuredToken was used, the OLS token is validated at block 906. At block 908, it is determined whether the token is invalid. If the token is invalid, an error is returned at block 910. Is the token is valid, the TokenUseCount is determined at block 912. The user that is associated with the token is then retrieved at block 914. The method then proceeds to block 916.

In addition, if it is determined that a SecuredToken was not used at block 904, the method 900 proceeds to block 918, at which the identity ticket is validated. The method then continues at block 916, at which it is determined whether the user is on hold. If the user is on hold, an error is returned at block 920. Otherwise, it is determined whether the EntitlementID exists at block 922. If the EntitlementID does not exist, an error is returned at block 924. Otherwise, it is determined whether the entitlement is suspended or deprovisioned at block 926. If the entitlement has been suspended or deprovisioned, an error is returned at block 928. Otherwise, the method 900 continues to the keyless authorization flow discussed below with respect to FIG. 10.

Figure 10:
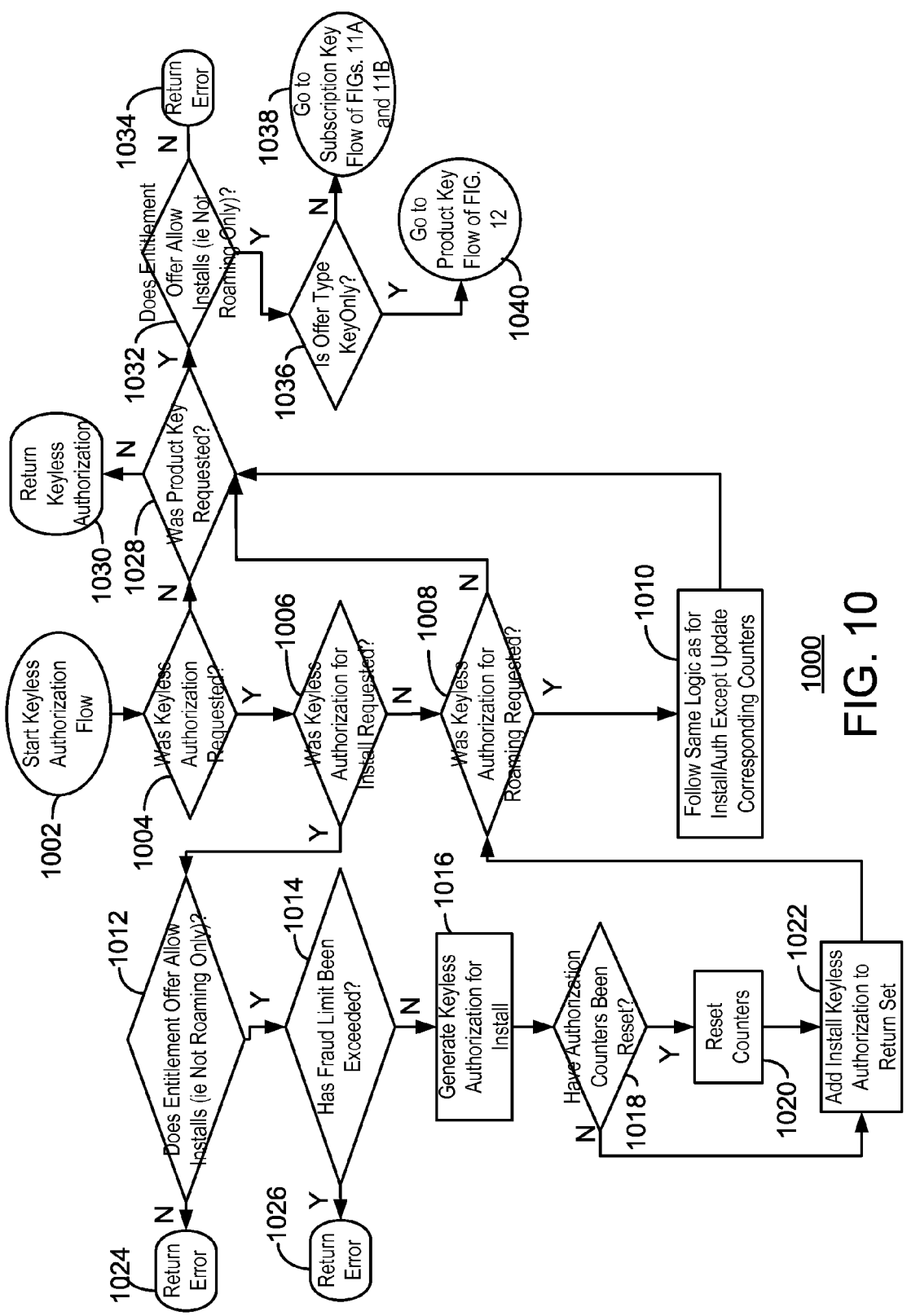
FIG. 10 is a process flow diagram of a method for provisioning a keyless authorization as appropriate.

FIG. 10 is a process flow diagram of a method 1000 for provisioning a keyless authorization as appropriate. The purpose of the keyless authorization may be to enable the client to run Office temporarily without OSPP and without activation using a product key. This may be useful during a first run of an installation or during roaming application scenarios, for example.

The keyless authorization may be a signed string that includes an authorization string that is used by the client to enable temporary Office access and is stored in the Offer as BaseAuthString. The keyless authorization may also include a number of parameters, including a HWID parameter that is sent by the client on the GetKey( ) request, and a TimeValidEnd parameter that represents the date and time at which the client may no longer use the keyless authorization.

The keyless authorization flow of the method 1000 begins at block 1002. In various embodiments, the method 1000 is executed after the method 900, as discussed above. The method 1000 may include making a number of determinations at blocks 1004-1022, including determinations regarding the type of key that was requested by the client, for example. If the conditions of the method 1000 are not met at blocks 1012 or 1014, an error may be returned at blocks 1024 or 1026.

If conditions presented in the method 1000 have been met, it may be determined at block 1028 whether a product key was requested. If a product key was not requested, a keyless authorization is returned at block 1030. If a product key was requested, it may be determined whether the entitlement offer allows installs, i.e., is not roaming only, at block 1032. If the entitlement offer does not allow installs, an error is returned at block 1034. Otherwise, it is determined whether the offer type is KeyOnly at block 1036.

Figure 11A:
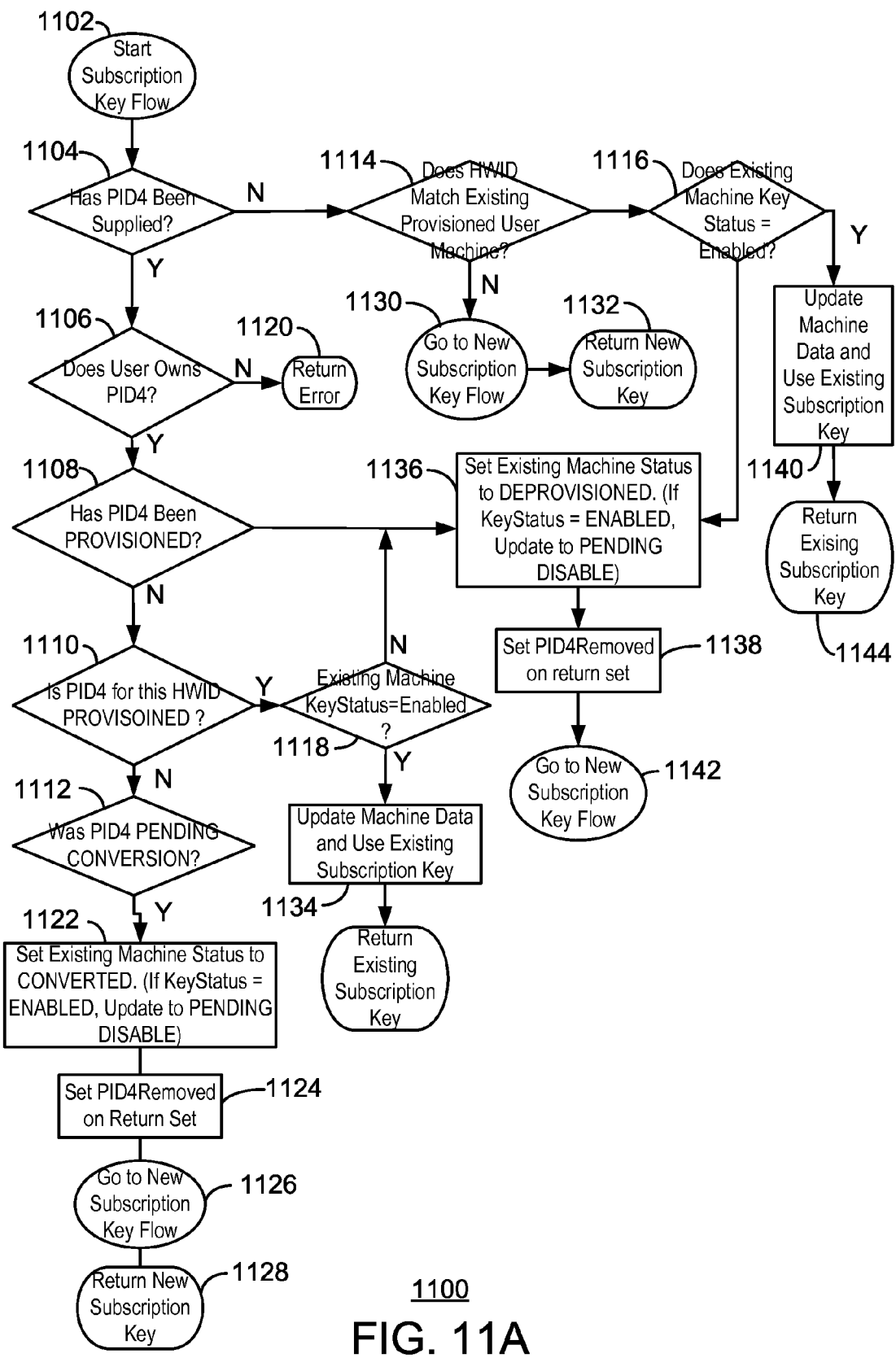
FIG. 11A is a process flow diagram of a method for retrieving an existing subscription (or TBL) key.
Figure 11B:
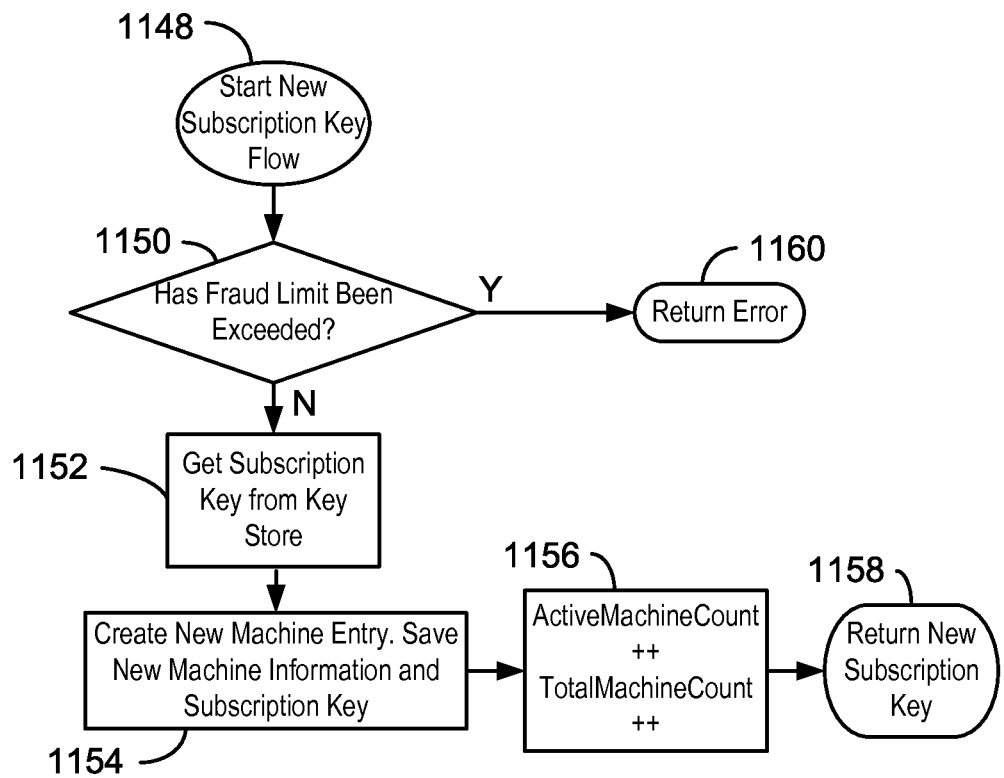
FIG. 11B is a process flow diagram of a method for obtaining a new subscription key.

If the offer type is not KeyOnly, the method 1000 proceeds to the subscription key flow of FIG. 11A or 11B, as shown at block 1038. If the offer type is KeyOnly, the method 1000 proceeds to the product key flow of FIG. 12A or 12B, as shown at block 1040.

FIG. 11A is a process flow diagram of a method 11000 for retrieving an existing subscription (or TBL) key. In various embodiments, an existing key is retrieved if the MachineKey and HWID used in the GetKey( ) API call are identical to those stored in the OLS. The subscription key flow of the method 1100 begins at block 1102. In various embodiments, the method 1100 is executed after the method 1000, as discussed above. The method 1100 may include making a number of determinations and executing a number of steps at blocks 1104-1140. In some embodiments, the method 1100 proceeds to the new subscription key flow of FIG. 11B, as shown at block 1142. In other embodiments, an existing subscription key is returned at the end of the method 1100, as shown at block 1144.

FIG. 11B is a process flow diagram of a method 1146 for obtaining a new subscription key. In various embodiments, a new key is retrieved from the key store if a new install has occurred, a machine has run out of tolerance reactivations, an entitlement conversion has taken place, or a machine has been reprovisioned. The method 1146 may be executed after the method 1000 or the method 1100, as discussed above.

The new subscription key flow of the method 1146 begins at block 1148. After performing a number of steps at blocks 1150-1156, a new subscription key is returned at block 1158. Alternatively, if a condition of the method 1146 is not met at block 1150, an error is returned at block 1160, and a new subscription key is not obtained.

Figure 12A:
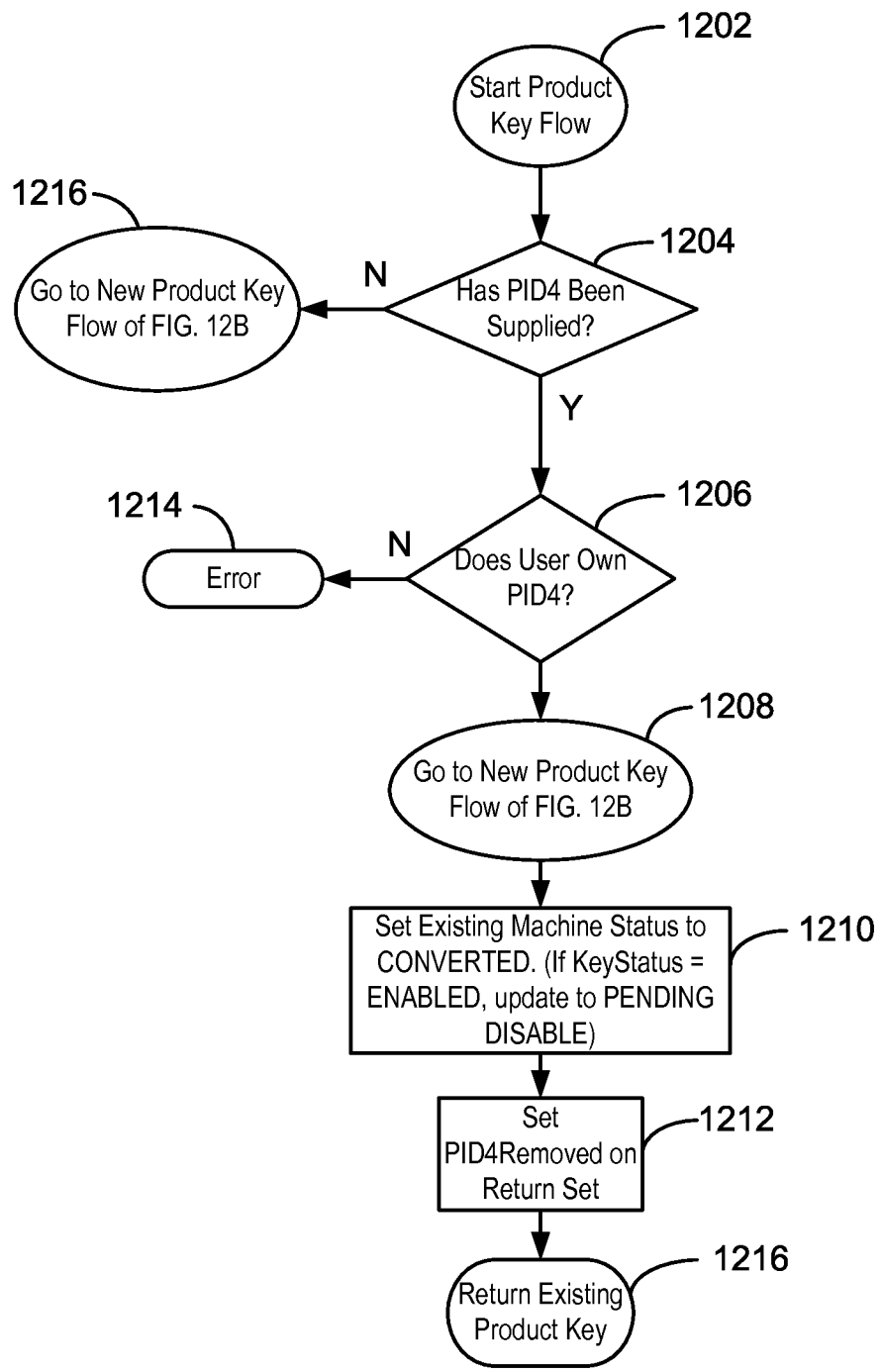
FIG. 12A is a process flow diagram of a method for retrieving an existing product key.

FIG. 12A is a process flow diagram of a method 1200 for retrieving an existing product key. The method 1200 may apply to KeyOnly offer types. In various embodiments, the method 1200 is executed after the method 1000, as discussed above. The product key flow of the method 1200 begins at block 1202. The method 1200 may include making a number of determinations and executing a number of steps at blocks 1204-1212. In some embodiments, if a condition of the method 1200 is not met at block 1206, an error is returned at block 1214. In other embodiments, the method 1200 proceeds to the new product key flow of FIG. 12B, as shown at block 1216. Further, in other embodiments, an existing product key is returned at the end of the method 1200, as shown at block 1216.

Figure 12B:
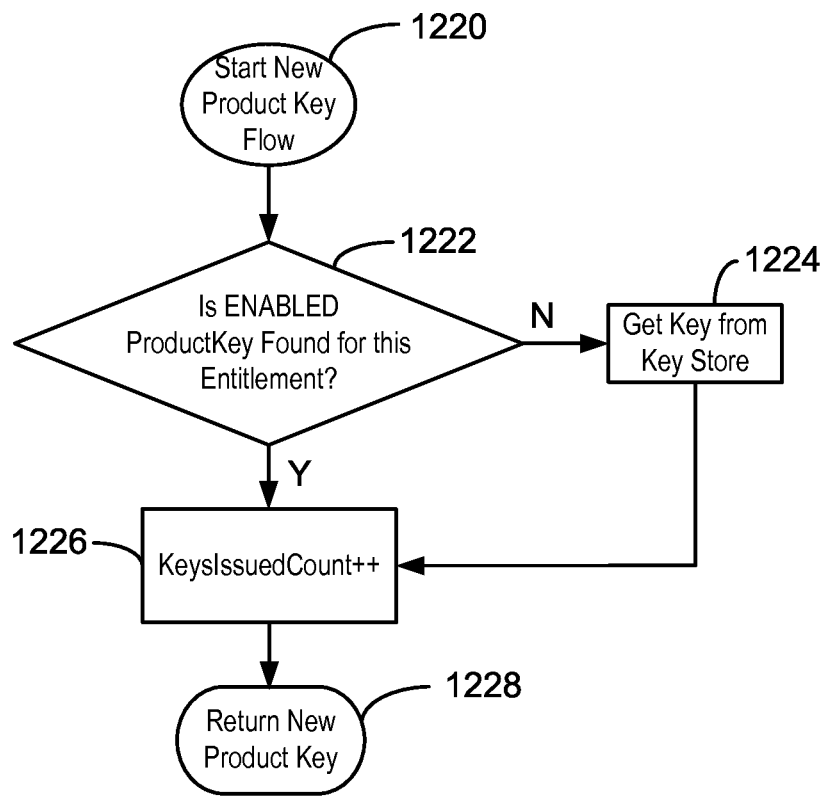
FIG. 12B is a process flow diagram of a method for obtaining a new product key.

FIG. 12B is a process flow diagram of a method 1218 for obtaining a new product key. A new product key may only be obtained if an entitlement is new or has been converted from a previous entitlement. The method 1218 may be executed after the method 1000 or the method 1200, as discussed above. The new product key flow of the method 1218 begins at block 1220. The method 1218 may include making a number of determinations and executing a number of steps at blocks 1222-1226. A new product key is then returned at the end of the method 1218, as shown at block 1228.

Figure 13:
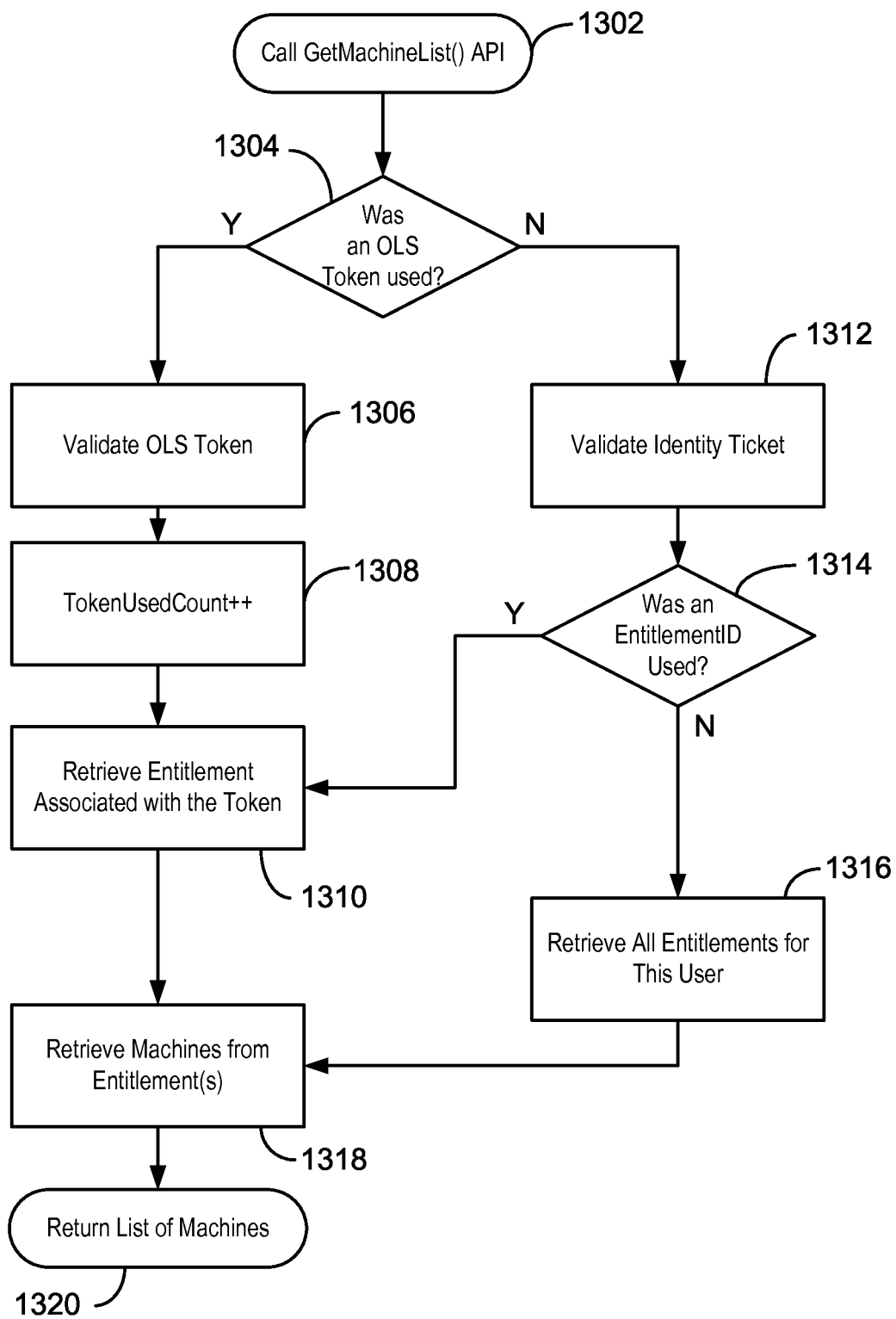
FIG. 13 is a process flow diagram of a method for retrieving machines from an entitlement.

FIG. 13 is a process flow diagram of a method 1300 for retrieving machines from an entitlement. The method 1300 may be executed using a GetMachineList( ) API. The GetMachineList( ) API may return machines for which the user has requested keys. Callers may request machines associated with a specific entitlement, or machines having a specific status.

The method 1300 may begin at block 1302, at which the GetMachineList( ) API is called. The method 1300 may include making a number of determinations and executing a number of steps at blocks 1304-1316. The machines from the entitlement(s) are then retrieved at block 1318, and the list of machines is returned at block 1320.

In various embodiments, if the API is requested to attempt to GetMachineList( ) from an entitlement which is currently on a perpetual offer, the API will still attempt to retrieve machines from that entitlement because it is possible that the entitlement was converted from a subscription offer and does have machines that are currently using subscription keys.

Figure 14:
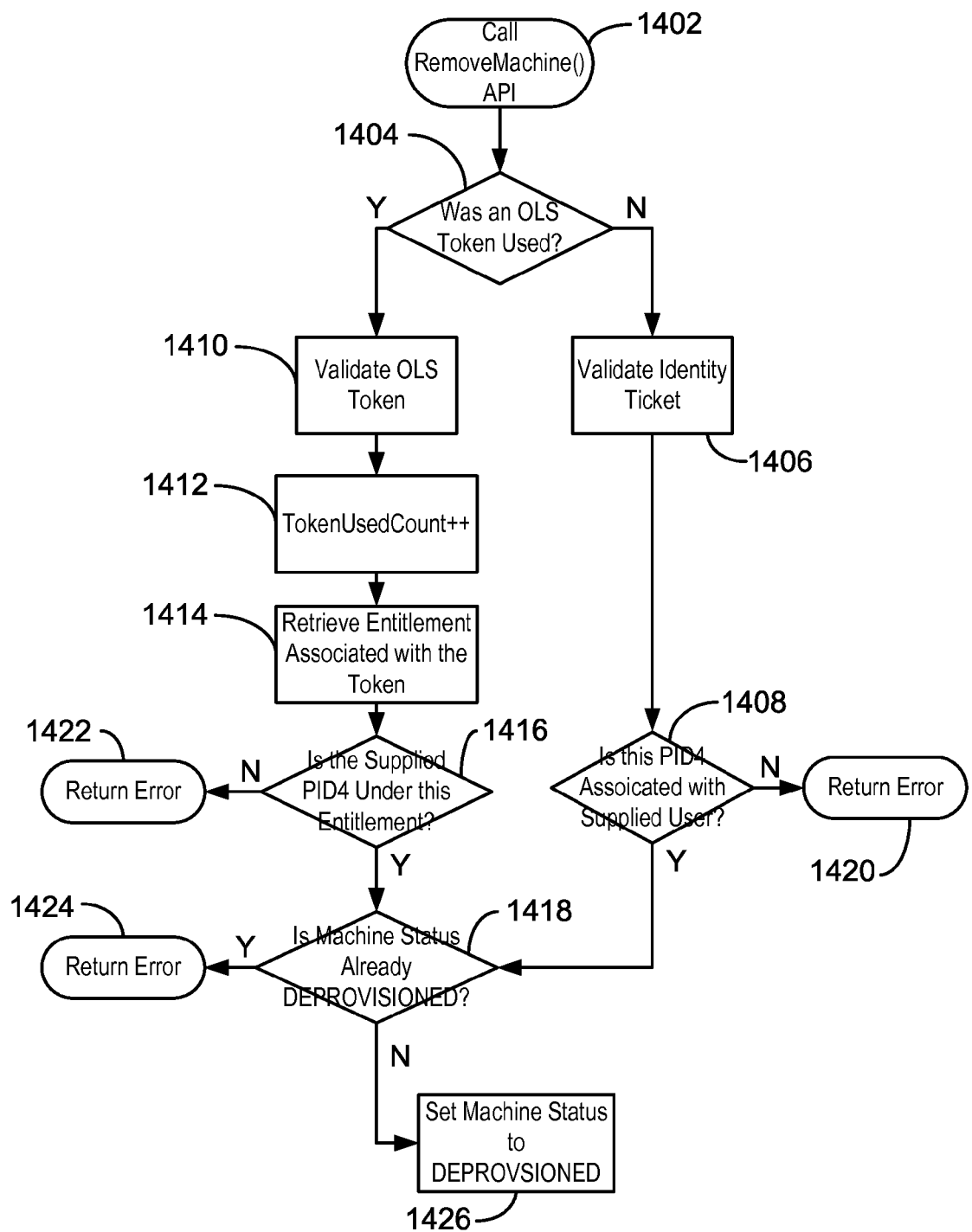
FIG. 14 is a process flow diagram of a method for deprovisioning a specific machine from an entitlement.

FIG. 14 is a process flow diagram of a method 1400 for deprovisioning a specific machine from an entitlement. The method 1400 may be executed using a RemoveMachine( ) API. The RemoveMachine( ) API may be used to mark machines for deprovisioning. The deprovisioning may then be performed asynchronously.

The method 1400 may begin at block 1402, at which the RemoveMachineList( ) API is called. The method 1400 may include making a number of determinations and executing a number of steps at blocks 1404-1418. In some embodiments, if one of the conditions of the method 1400 is not met at blocks 1408, 1416, or 1418, an error may be returned at block 1420, 1422, or 1424, respectively. Otherwise, the machine status is set to deprovisioned at block 1426. This effectively removes the machine from the entitlement.

In various embodiments, the GetUrlForEntitlement( ) API returns the download URL to download the bits for an entitlement. This API functions similarly to the provisioning GetDownloadInfo( ) API. However, the identity that is used may be tickets issued by BPOS or Live, or an OLS SecureToken, rather than a PUID. The SecureToken may not be regenerated if the identity used is an OLS SecureToken. Rather, the existing token may be used in the URL. This API also only returns the URL, not the download parameters.

According to embodiments described herein, the product key cache is a key store from which the OLS obtains keys. The product key cache is a database that is independent of the OLS core licensing database, and is populated by an asynchronous process which retrieves keys from a JIT system whenever the number of available keys in the cache falls below a certain threshold.

The product key cache may store metadata on each key, including the PKPN of the key; the JIT SKU of the PKPN, and the datacenter country from which the key was originally obtained. The product key cache may be able to return a tax compliant key based on several parameters supplied by the GetKey( ) logic, including entitlement KeyStoreReqId, which is an Offer attribute, and BillingCountryISO, which is obtained from the entitlement.

Within the OLS, the product key deprovisioning component may be an asynchronous service that runs independently of the core system. The product key deprovisioning component may run on a regular schedule that is initially set to once per day.

During the product key deprovisioning component's scheduled run, it may identify machines with key statuses, i.e., KeyStatus, that are pending disable and dates of last key status update, i.e., KeyStatusLastUpdate, of greater than two months. In addition, during the product key deprovisioning component's scheduled run, it may identify product keys with key statuses that are pending disable and dates of last key status update of greater than one month. In some embodiments, a machine can be deprovisioned due to a sync provider update or a user action, such as in response to a user removing the machine from the entitlement.

Office Marketplace Experience Sync Provider

The OMEX sync provider may be used to receive provisioning updates from the OMEX partner and to publish those updates into the OLS. More specifically, the OMEX sync provider is an abstraction layer that exposes a set of APIs for the OMEX partner to perform various provisioning tasks without allowing the OMEX partner direct access to the private provisioning layer in the OLS.

Figure 15A:
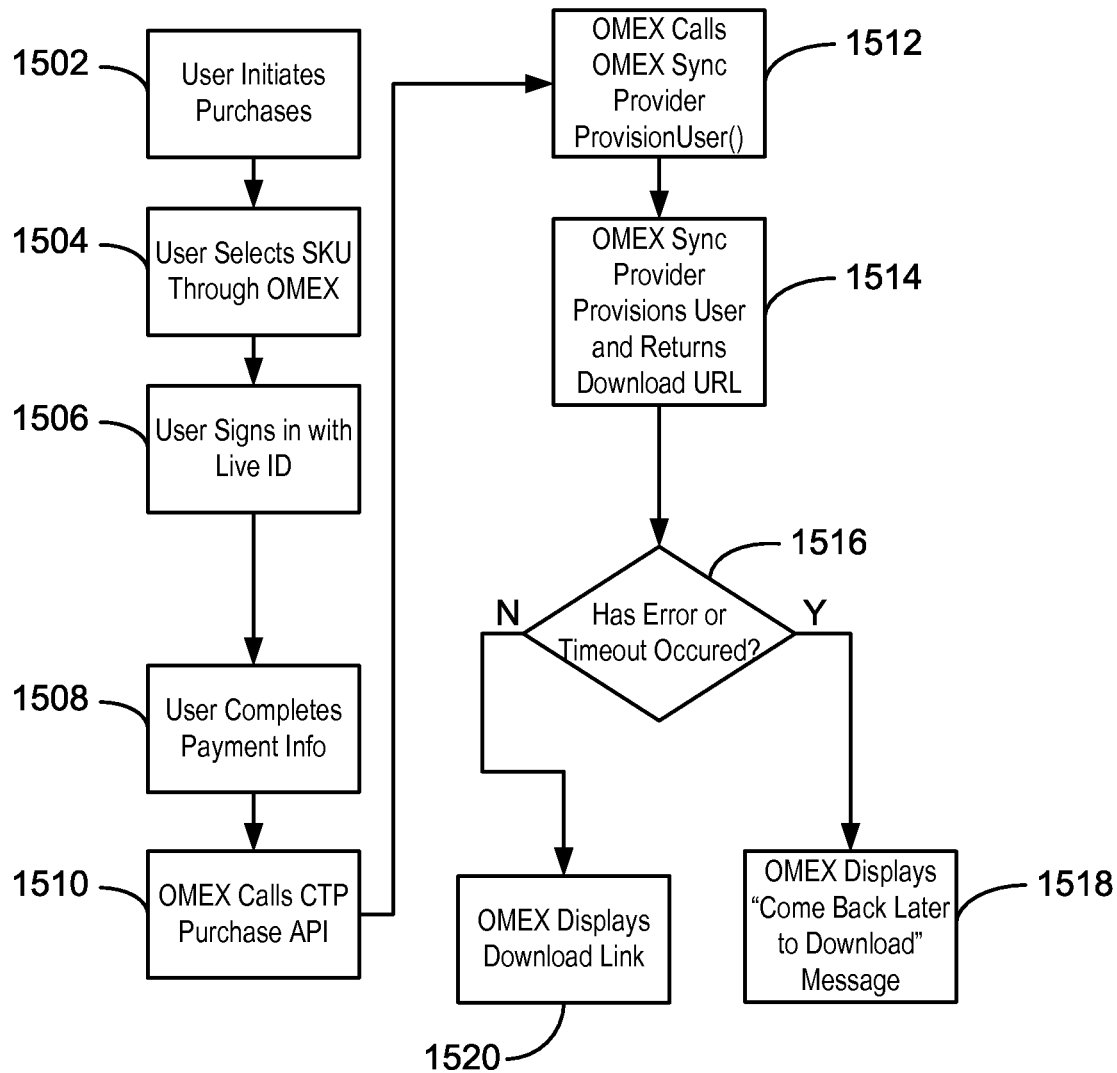
FIG. 15A is a process flow diagram of a method for the initial purchase of an entitlement by a user.

FIG. 15A is a process flow diagram of a method 1500 for the initial purchase of an entitlement by a user. The method 1500 may be executed using the OMEX sync provider discussed above. The user initiates the purchase at block 1502, and the user selects the SKU through OMEX, either via the client or via the Web, at block 1504. At block 1506, the user signs in using his Live ID, and the user completes the payment information for purchasing the entitlement at block 1508.

OMEX calls CTP to complete the purchase action at block 1510, and calls the OMEX sync provider to provision the user, i.e., ProvisionUser( ) at block 1512. At block 1514, the OMEX sync provider provisions the user and returns the download URL. Provisioning the user in OLS may be accomplished using the ProvisionUser( ) API. The ProvisionUser( ) API may only be called by the OMEX partner.

In some cases, there is a timeout on the call to the sync provider. Therefore, at block 1516, it may be determined whether an error or timeout has occurred. If an error or timeout has occurred, a "come back later to download" message may be displayed to the user at block 1518. Otherwise, OMEX displays the download link for the entitlement to the user at block 1520.

Figure 15B:
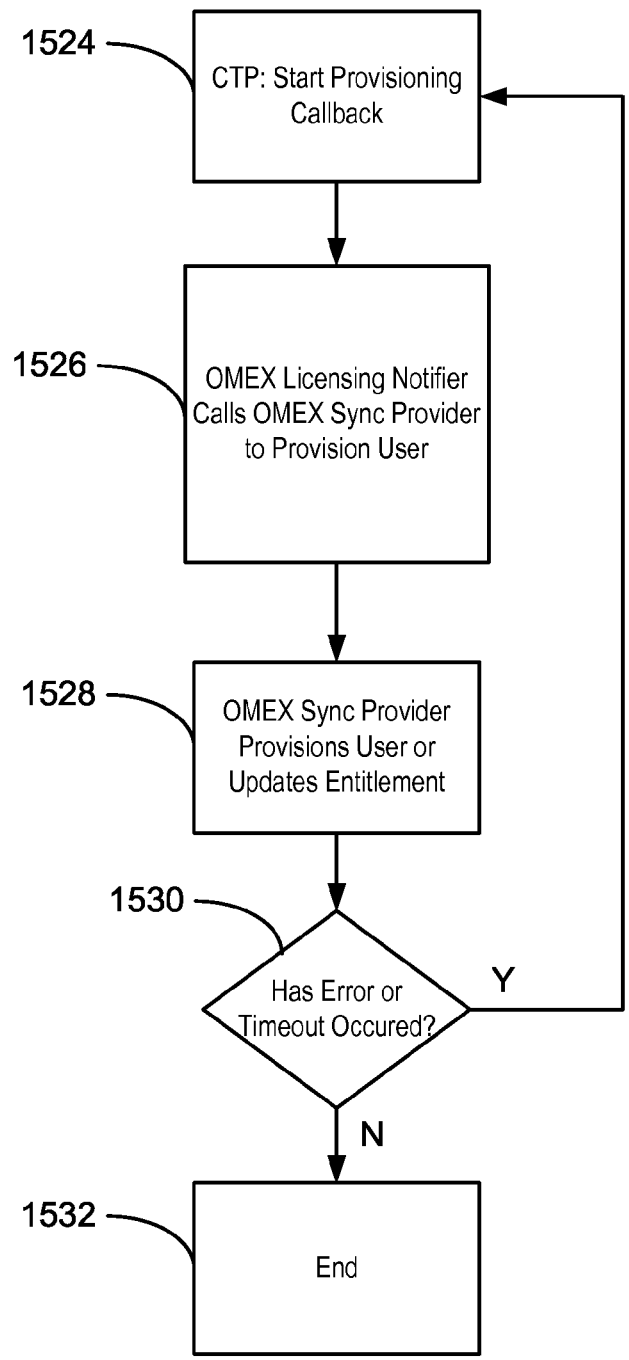
FIG. 15B is a process flow diagram of a method for updating an entitlement.

FIG. 15B is a process flow diagram of a method 1522 for updating an entitlement. The method 1522 begins at block 1524, at which the CTP starts the provisioning callback. At block 1526, the OMEX licensing notifier calls the OMEX sync provider to provision the user using the ProvisionUser( ) API. At block 1528, the OMEX sync provider provisions the user or updates the entitlement. It is then determined whether an error or timeout has occurred at block 1530. If an error or timeout has occurred, the method 1522 returns to block 1524. Otherwise, the method 1522 ends at block 1532.

Figure 16:
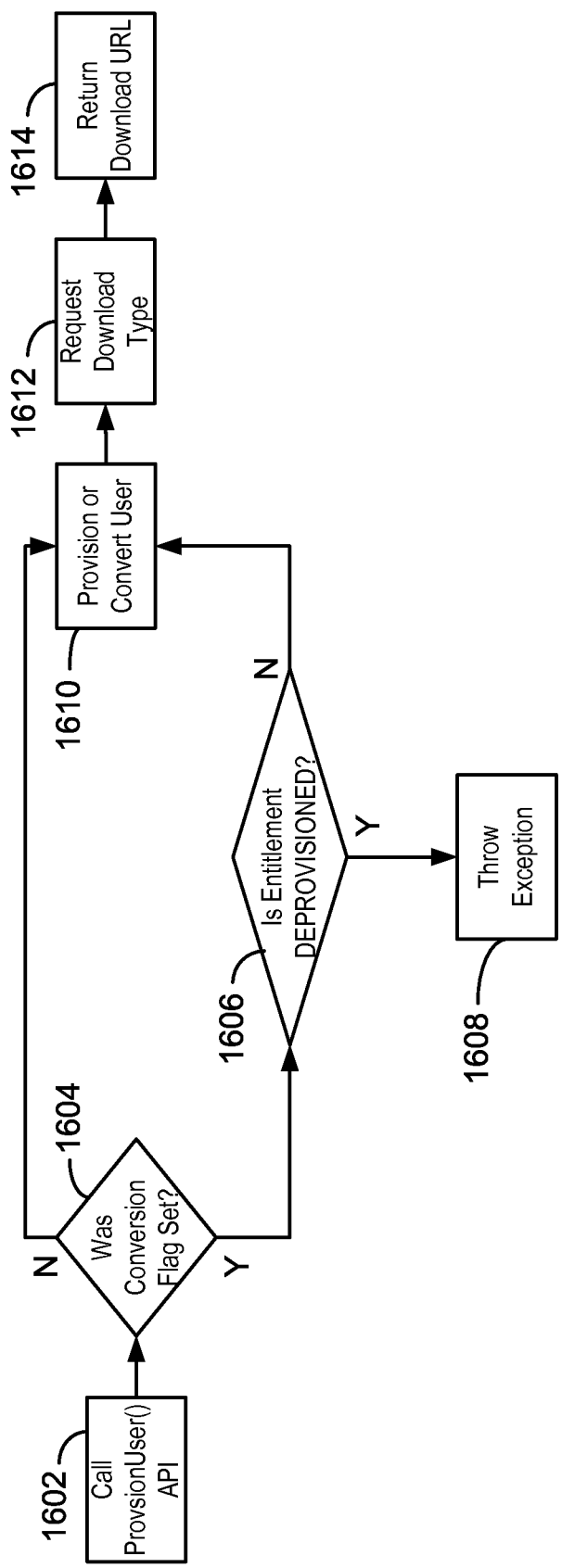
FIG. 16 is a process flow diagram of a method for provisioning a user in OLS, or converting a user from one entitlement to another.

FIG. 16 is a process flow diagram of a method 1600 for provisioning a user in OLS, or converting a user from one entitlement to another. The method begins at block 1602, at which the ProvisionUser( ) API is called. It is determined whether a conversion flag was set a block 1604.

If a conversion flag was set, it may be determined whether the entitlement has been deprovisioned at block 1606. If the entitlement has been deprovisioned, an exception is thrown at block 1608. Otherwise, the user is converted to another entitlement at block 1610. Alternatively, if a conversion flag was not set at block 1604, the user is provisioned at block 1610.

A DownloadType is then requested at block 1612, and a download URL is returned at block 1614. The returned download URL may include a secured token, e.g., a GUID, that allows a user to activate Office without retyping his credentials. Therefore, the use of the URL may be limited. In some embodiments, a GetDownloadInfoForEntitlement( ) API is used to regenerate the download link as appropriate.

Figure 17:
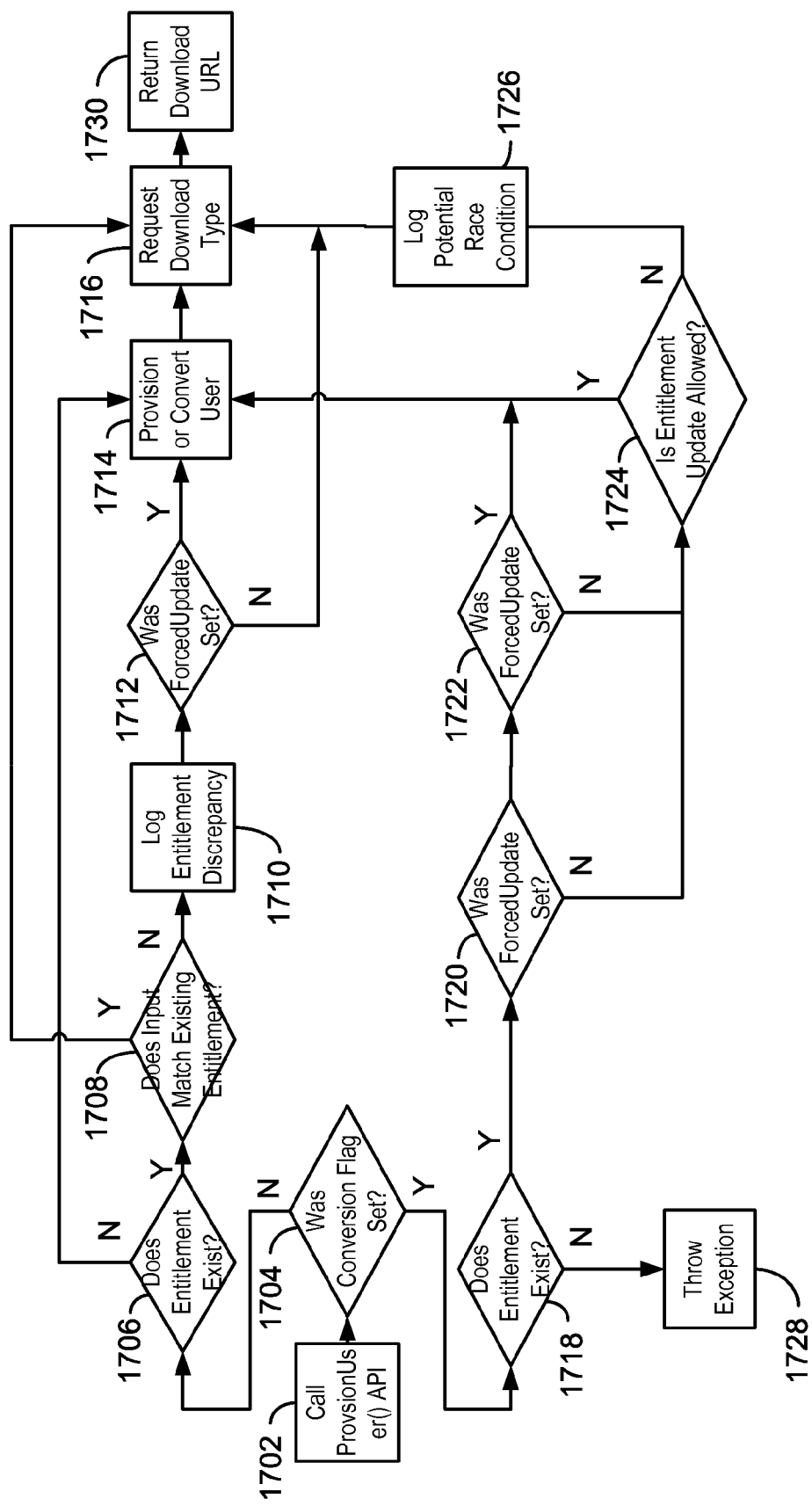
FIG. 17 is a process flow diagram of a method for determining whether to update an entitlement according to a ForcedUpdate process.

FIG. 17 is a process flow diagram of a method 1700 for determining whether to update an entitlement according to a ForcedUpdate process. The method 1700 may begin at block 1702, at which the ProvisionUser( ) API is called. The method 1700 may include making a number of determinations and executing a number of steps at blocks 1704-1726. In some embodiments, it is determined that the entitlement does not exist at block 1718, and an exception is thrown at block 1728.

Otherwise, the method 1700 continues to block 1730, at which a download URL is returned. The download URL may vary depending on whether a ForcedUpdate has been set, as determined at block 1712 or block 1722, and whether an entitlement update is allowed, as determined at block 1724.

According to the method 1700, ForcedUpdate may be specified during the asynchronous CTP provisioning call because it may be the ultimate authority on what the user has bought. A discrepancy may occur in race conditions wherein the asynchronous CTP provisioning call occurs before the provisioning call initiated during purchase. In some cases, if ForcedUpdate is specified during provisioning, another update to the same EntitlementID may not be allowed for 10 seconds from the last successful update unless ForcedUpdate is set on the new ProvisionUser( ) API call. In this case, the call will succeed and will return information based on existing entitlement information. The time value may be configurable, and the logic for this check may be isolated in the sync provider layer.

For cases in which an update to the user's entitlement is not made, but the call returns successfully, the response may contain a flag that indicates to the caller that the update was not made. The response may also contain the entitlement information that is already in the system. The caller may use the entitlement information for troubleshooting or to take other additional actions.

Licensing for Devices

According to embodiments described herein, the OLS may be updated in order to support licensing of different types of devices and specific applications relating to the different types of devices. For example, the OLS may support licensing of Office, e.g., Office 2015, in the form of MOX applications, Mobile Office applications, Android applications, Windows Mobile applications, and Mac Office applications, among others. Therefore, the OLS may allow for licensing of Office across many different platforms.

Within the OLS, the term "computers" may refer to PCs and Macs, and the term "devices" may refer to MOX (or Slates) and mobile phones. Collectively, computers and devices may both be referred to as "machines" within the OLS.

Licenses for devices within the OLS may be in the form of either credential based licenses or token based licenses. For credential based licenses, any devices may share one license count, while any computers may share another license count. For token based licensing, a license token is used instead of an OLS token. License tokens can be used an unlimited number of times per device. There will be no device count beyond limiting each license token such that it may only be used on one device.

Device applications, e.g., MOX and Mobile applications, may be distributed through the platform's application store, e.g., Apple store, via OEM-preinstall, e.g., Windows Mobile, or via website download, e.g., Android. Licensing rights for each device can be obtained via the platform's application store with no OLS involvement, the OLS with the purchase of a managed or an unmanaged subscription, or the OLS with a VL agreement.

Figure 18A:
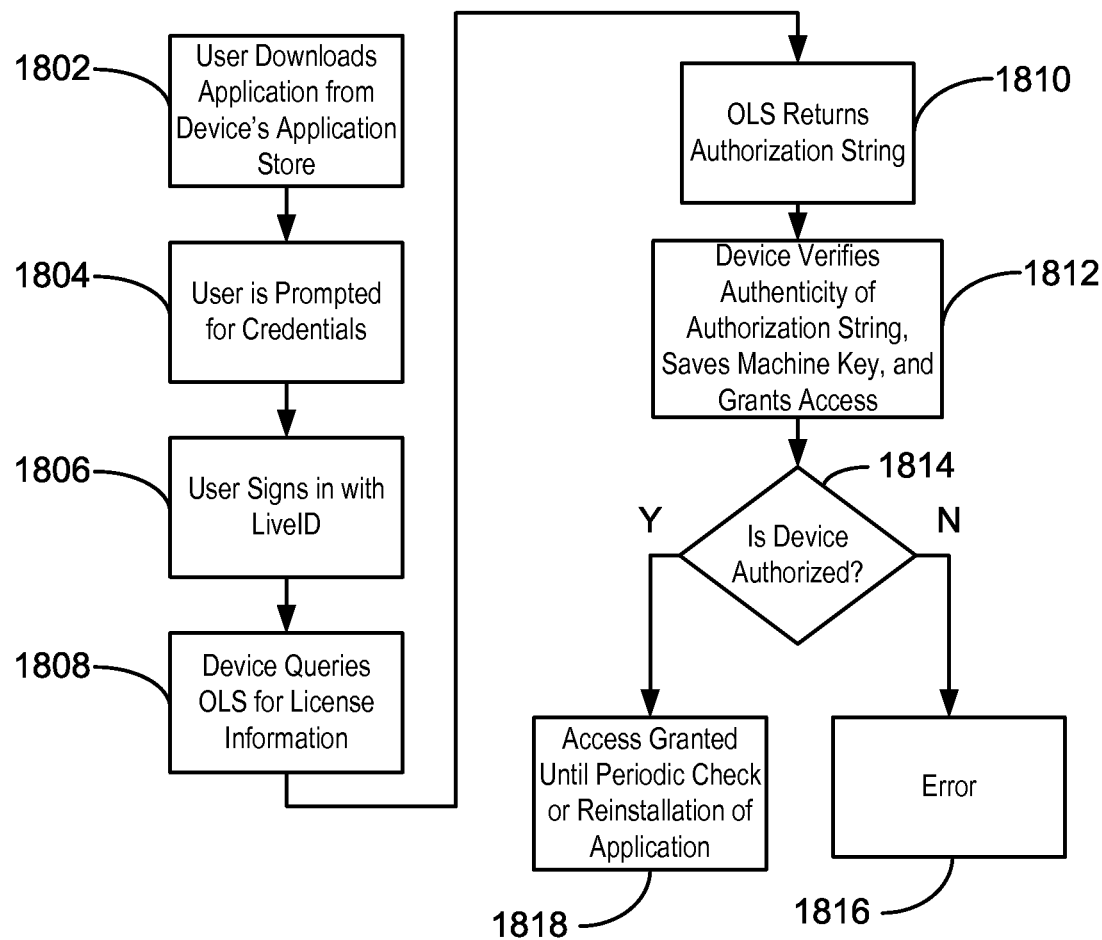
FIG. 18A is a process flow diagram of a method for the initial licensing of an application for a device.

FIG. 18A is a process flow diagram of a method 1800 for the initial licensing of an application for a device. The method 180 begins at block 1802, at which the user downloads the application from the device's application store. At block 1804, the user is prompted for his credentials. At block 1806, the user signs in using his Live ID or other credentials. The device then quires the OLS for license information at block 1808, and the OLS returns an authorization string at block 1810. The device verifies the authenticity of the authorization string, saves the machine key, and grants access at block 1812.

It is determined whether the device is authorized at block 1814. If the device is not authorized, an error is returned at block 1816. If the device is authorized, access to the application is granted at block 1818 until a periodic check or reinstallation of the application.

Figure 18B:
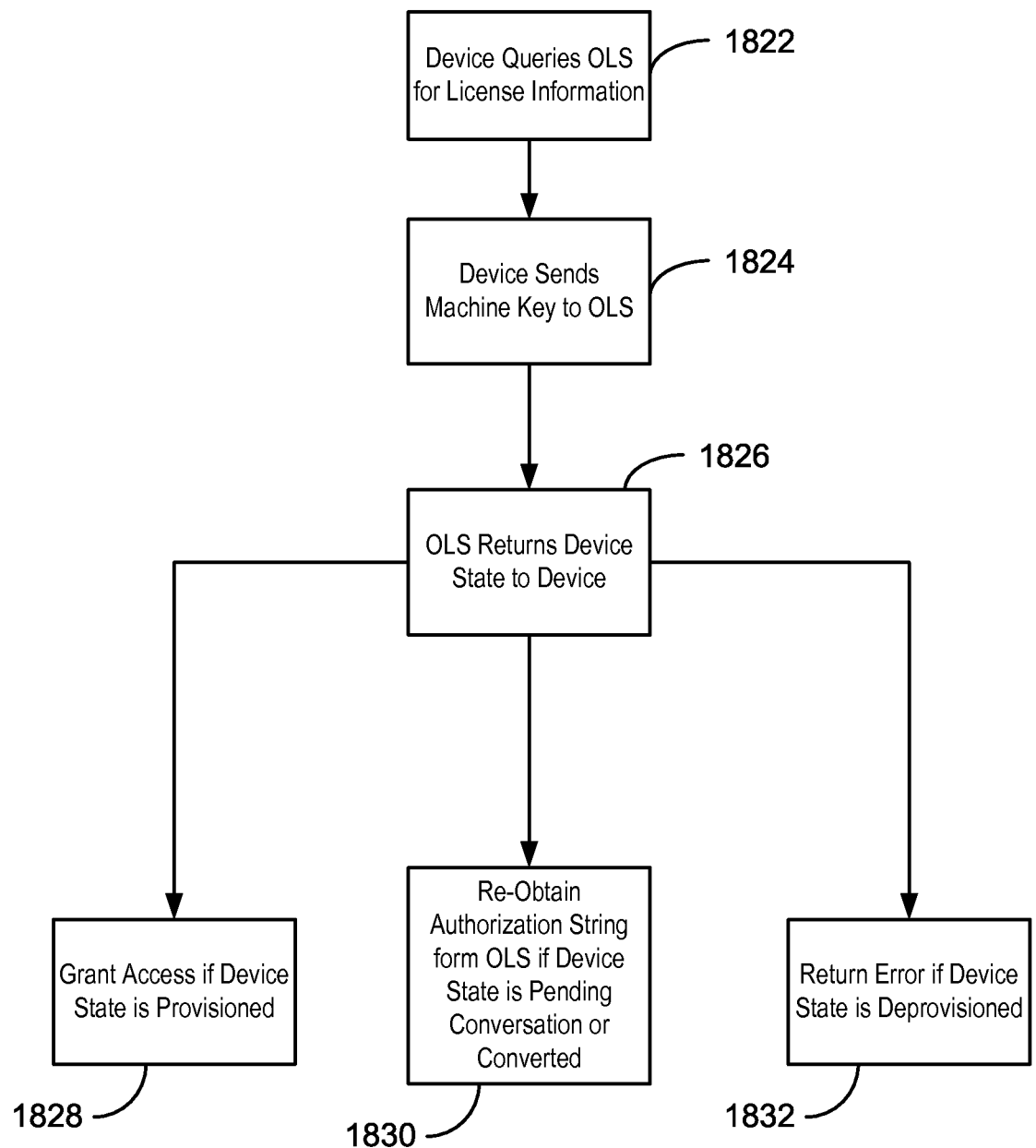
FIG. 18B is a process flow diagram of a method for periodically checking the state of a license.

FIG. 18B is a process flow diagram of a method 1820 for periodically checking the state of a license. In various embodiments, the method 1820 is performed in response to an application's first boot of the day.

The method 1820 begins at block 1822, at which a device queries the OLS for license information. The device may query the OLS on a device determined interval, such as every fifth log-in or every month. At block 1824, the device sends the machine key to the OLS.

At block 1826, the OLS returns the device state to the device. Access to the application is granted if the device state is provisioned, as shown at block 1828. The authorization string is re-obtained from the OLS if the device state is pending conversion or converted, as shown at block 1830. An error is returned if the device state is deprovisioned, as shown at block 1832.

Figure 19:
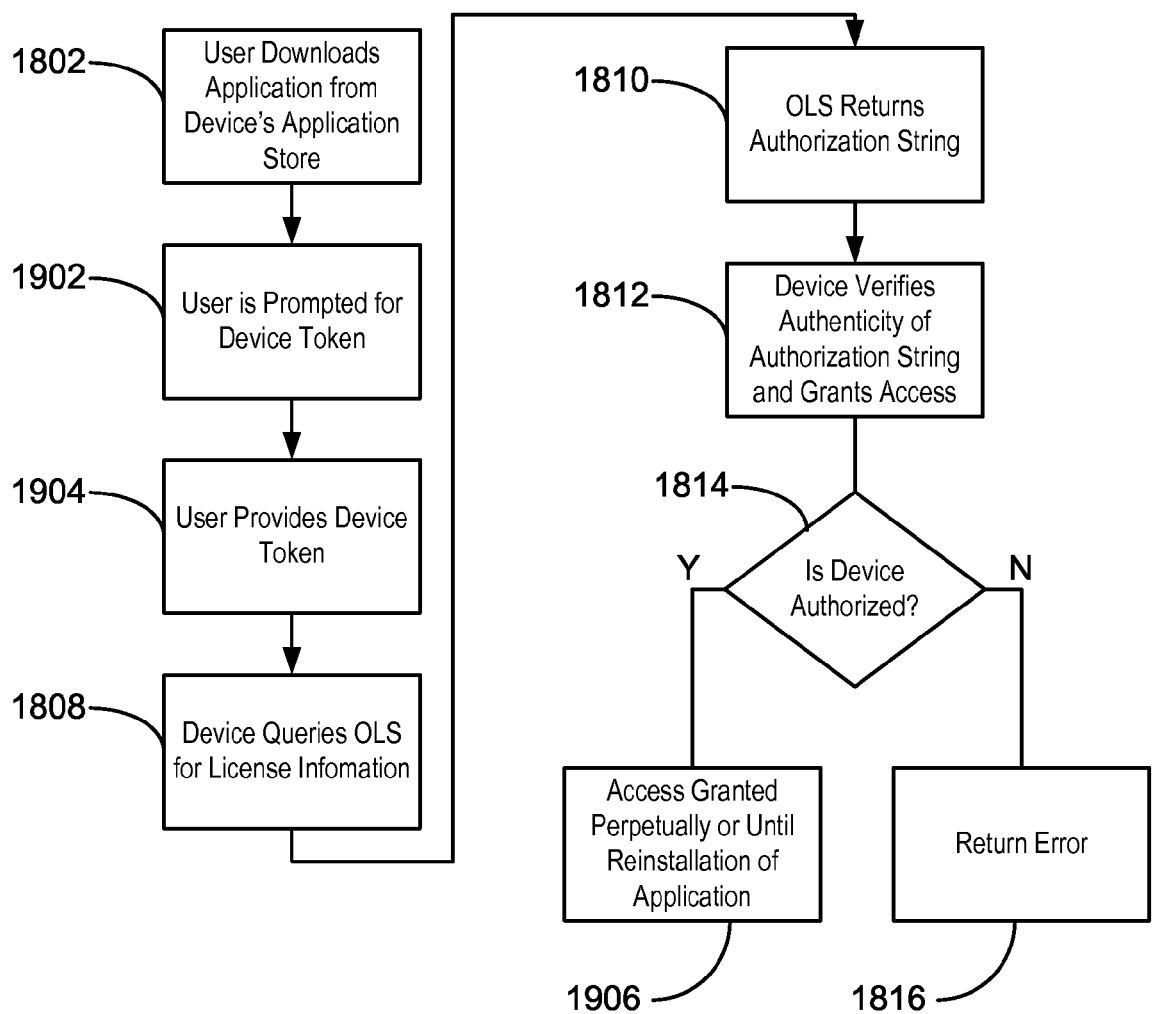
FIG. 19 is a process flow diagram of a method for initially licensing a device.

FIG. 19 is a process flow diagram of a method 1900 for initially licensing a device. Like numbered items are as described with respect to FIG. 18A. The method 1900 may be performed in response to the first boot of a particular application on the device.

The method 1900 may be similar to the method 1800 of FIG. 18A. However, the user is prompted for a device token at block 1902, and the user provides a device token at block 1904, instead of signing in with his Live ID or other credentials. Therefore, according to the method 1900, the license for the device is a token based license. For token based licensing, the device is perpetually licensed to use the application once the license has been initialized. Therefore, there may not be a periodic license check for the license. Accordingly, at block 1906, the device is granted access to the application perpetually, or until reinstallation of the application.

According to embodiments described herein, an OLS License is a new type of license that may be granted by the OLS. The OLS license may be issued by the GetOLSLicense( ) API. The OLS license may include a license string, i.e., MachineKey, a machine identification, i.e., MachineID, a valid date and time at which the authorization may begin to be used, i.e., TimeValidStart, and a valid date and time at which the authorization may no longer be used, i.e., TimeValidEnd.

A device may only honor an OLS license returned by the GetOLSLicense( ) API if the OLS license satisfies several criteria. For example, the OLS license may be verified to be signed by the OLS; the returned MachineID may be verified to match the MachineID used on the request; the TimeValidStart may be verified to match the current time used on the request; and the current client time may be verified to be between TimeValidStart and TimeValidEnd.

Licensing for Services

Embodiments described herein may be used to perform various functions relating to licensing for services. For example, embodiments described herein may allow a partner to identify whether a user is to be given access to its roaming setting service. In addition, such embodiments may provide Office services an interface by which to retrieve Office client provisioning information.

Figure 20:
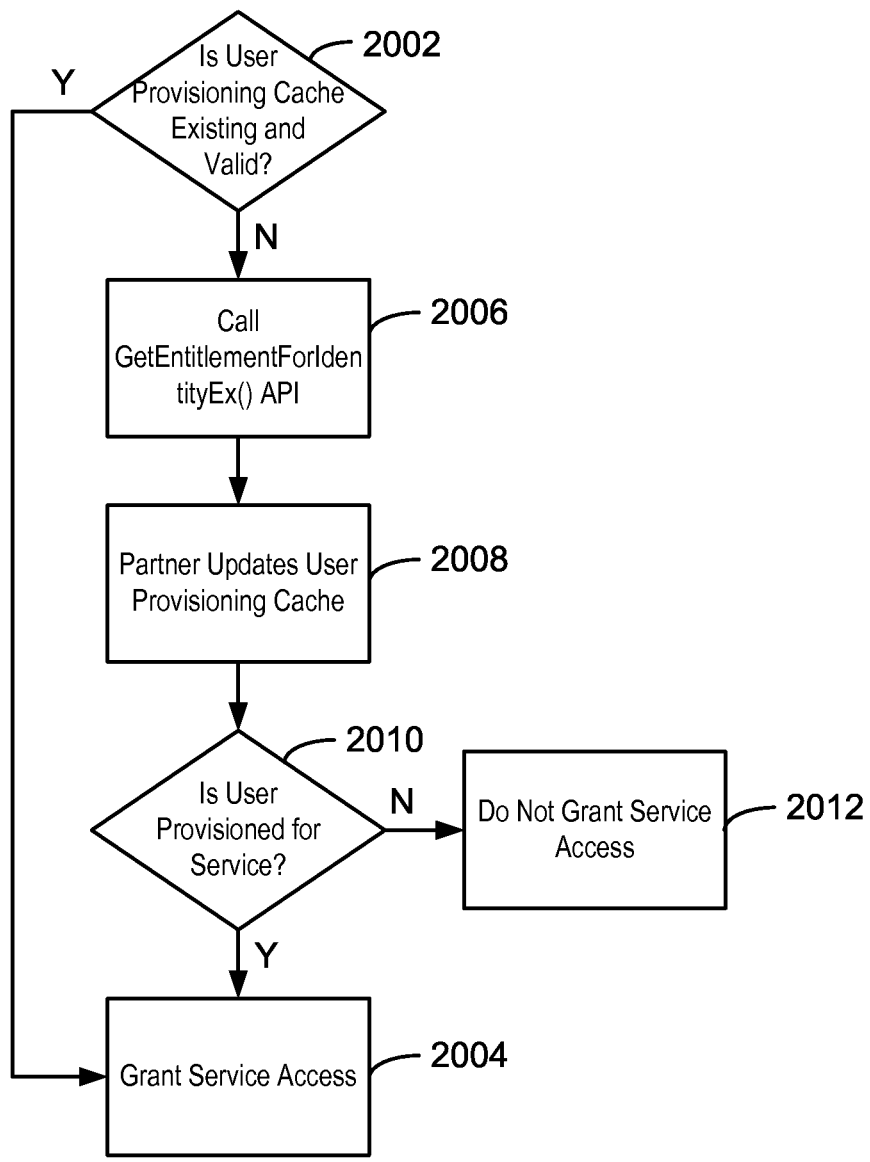
FIG. 20 is a process flow diagram of a method for the determination by a partner of whether a user is to be granted access to its services.

FIG. 20 is a process flow diagram of a method 2000 for the determination by a partner of whether a user is to be granted access to its services. Such a determination may be made using service provisioning information. In some embodiments, partners maintain a user provisioning cache that caches results from a GetEntitlementForIdentityEx( ) API call. This may enhance performance of the partner and reduce the load on the OLS. The length of the user provisioning cache may be adjusted according to the characteristics of the particular service. In addition, the user provisioning cache may expire based on how often real time information is desired by the service and the performance cost of calling the OLS for the provisioning information.

The method begins at block 2002, at which it is determined whether the user provisioning cache exists and is valid. If the user provisioning cache exists and is valid, access to the service is granted at block 2004. If the user provisioning cache either does not exist or is not valid, the provider calls the GetEntitlementForIdentityEx( ) API at block 2006. At block 2008, the partner updates the user provisioning cache. It is then determined whether the user is provisioned for the service at block 2010. If the user is not provisioned for the service, access to the service is not granted, as shown at block 2012. Otherwise, the user is granted access to the service at block 2004.

Geolocation and Geoscaling Services

In various embodiments, geolocation and geoscaling techniques are used to improve or maintain the performance, availability, reliability, and scalability of the OLS. The overall geolocation design for OLS may include a master datacenter and numerous replica datacenters, which may be geographically distributed around the world. This design may theoretically support an unlimited number of replica datacenters. Each replica datacenter may be brought online as appropriate.

The master datacenter may handle all OLS operations. For example, write operations, e.g., provisioning updates, may pass through the master datacenter first. The master datacenter may contain a master copy of provisioning information for every user. In addition, all sync provider components and key cache components may reside within the master datacenter. Further, a geo-syncer may be used to continuously monitor the master datacenter in order to determine updates that are to be synced to the replica datacenters.

Replica datacenters may handle all read operations, e.g., checking if a user has permission to access a service. Replica datacenters may also handle some write operations, e.g., issuing keyless authorizations. Each replica datacenter may contain a copy of the provisioning information for each user, and may obtain provisioning updates continuously from the master datacenter. Further, in the case of disaster recovery scenarios, any of the replica datacenters may become the master datacenter, as discussed further below.

Figure 21:
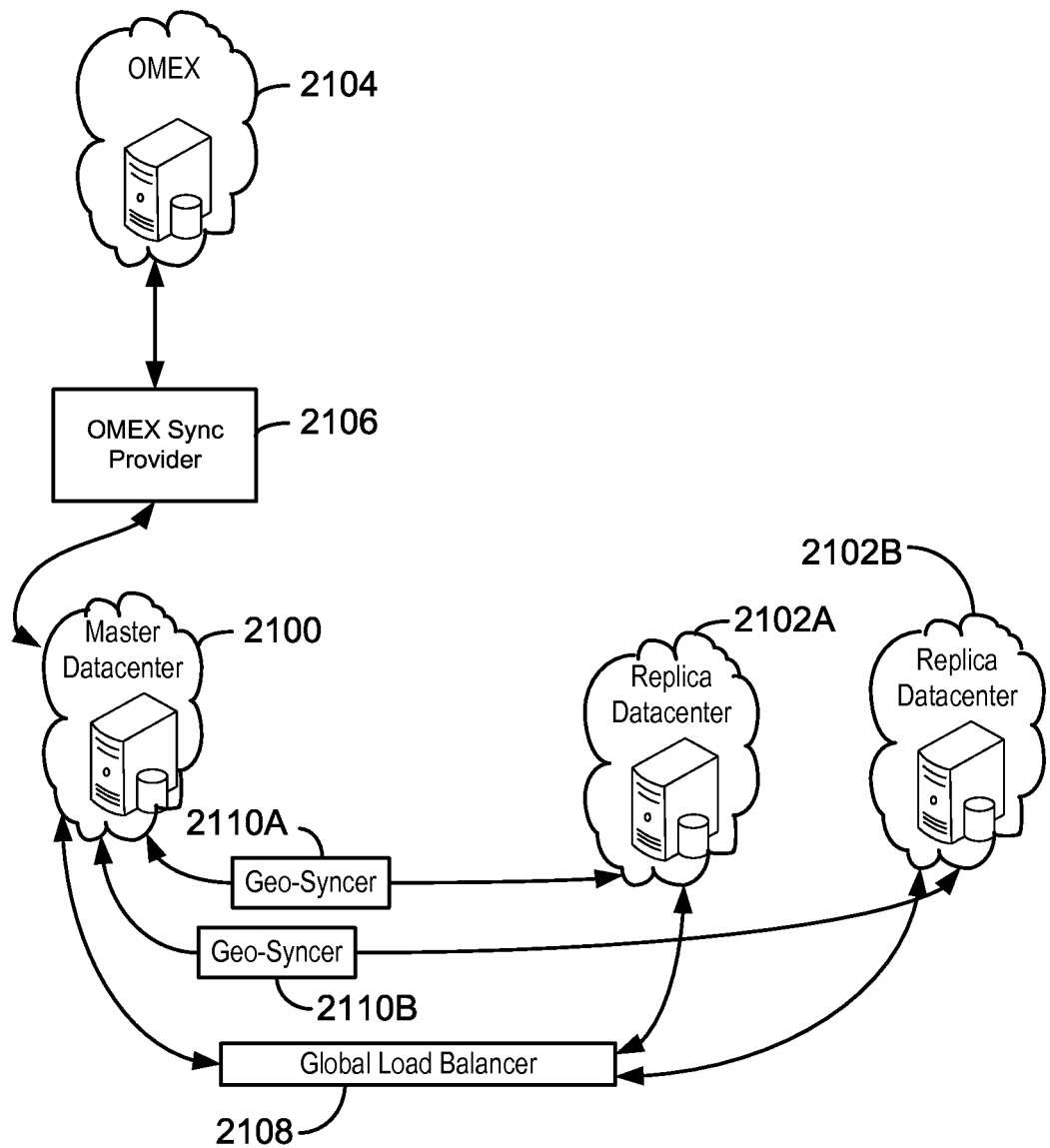
FIG. 21 is a schematic of an exemplary configuration of a master datacenter and multiple replica datacenters.

FIG. 21 is a schematic of an exemplary configuration of a master datacenter 2100 and multiple replica datacenters 2102A and 2102B. OMEX 2104 or other partners may be given a generic OLS URL, e.g., generic.ols.office.com, as well as a direct URL, e.g., master.ols.office.com, for the master datacenter 2100. For certain operations, such as operations of an OMEX sync provider 2106, OMEX 2104 may call the master.ols.office.com directly rather than using generic.ols.office.com. The calls may then be redirected from the master datacenter 2100 to either of the replica datacenters 2102A or 2102B based on logic within a global load balancer 2108.

In addition, a number of geo-syncers 2110A and 2110B may be used to sync information from the master datacenter 2100 into the replica datacenters 2102A and 2102B. Specifically, each geo-syncer may read data from a geo-sync table within the master datacenter 2100 and write the data into the replica datacenters 2102A and 2102B directly. Such data may include data relating to provisioning updates or product key information updates, for example.

The geo-sync table within the master datacenter 2100 may contain pointers to records in the OLS Core that may be synced into the replica datacenters 2102A or 2102B. Specifically, the geo-sync table may contain SourceTable Name, SourcePartition Key, SourceRow Key, ModifiedDateTime, and PublishPending pointers. Each time a write occurs in the OLS core table, except for writes that impact only attributes in the exception list, a record is created in the geo-sync table.

While only two geo-syncers 2110A and 2110B are shown in FIG. 21, the configuration may include a pool of geo-syncers 2110. As each geo-syncer 2110 wakes up, it attempts to obtain a lock to sync out to a replica datacenter 2102A or 2102B. Any geo-syncer 2110 may sync to any replica datacenter 2102A or 2102B. However, only one geo-syncer 2110 may be active per replica datacenter 2102A or 2102B at one time. Each geo-syncer 2110 will attempt to finish syncing against a single replica datacenter 2102A or 2102B before attempting to obtain a lock to sync to the next replica datacenter 2102A or 2102B. Further, all geo-syncers 2110 may be run within the master datacenter 2100. In various embodiments, the master datacenter 2100 contains a lock configuration file that lists all replica datacenters 2102A and 2102B, the corresponding locks, the corresponding lock durations, the corresponding PublishPending fields in the geo-sync table, and a switch to turn actual syncing on or off. In addition, in some embodiments, a centralized sync controller (not shown) may be used to manage the functioning of the geo-syncers 2110.

Any number of new replica datacenters may be brought online at any point in time. When a new replica datacenter is brought online, a configuration entry for the new replica datacenter may be added to the lock configuration file within the master datacenter 2100. Initially, the configuration entry may mark the new replica datacenter as "off" to ensure that changes will start to be tracked for the replica datacenter. The current time may be noted, and all data within the master datacenter 2100 up to the current time may be replicated into the new replica datacenter. The configuration entry may then mark the new replica datacenter as "on." The geo-syncing procedure may then function normally.

Disaster Recovery

According to embodiments described herein, the use of the multiple datacenters, e.g., one master datacenter and at least two replica datacenters, within the licensing system allows for disaster recovery in the case of the failure of a datacenter. For example, a new datacenter can be brought online at any point in time as a replacement datacenter for a datacenter that has failed. A replica datacenter may also be promoted to the master datacenter if the previous master datacenter has failed. In addition, planned downtimes may be implemented at any point in time.

The disaster recovery procedure may be used to recover OLS data. Because the OLS replicates data from the master datacenter to the replica datacenters, there is already some built in redundancy within the licensing system. However, due to geo-sync delays, data within each replica datacenter will likely not be at 100% parity with the master datacenter or with other replica datacenters at any point in time. Therefore, some data may be lost in the event of a disaster. In addition, the OLS may include provisioning data such as entitlement provisioning data, OMEX provisioning data, and BPOS provisioning data. While some provisioning data may be recoverable from OLS provisioning partners in the event of a disaster, some amount of provisioning data may be lost. Therefore, it may be desirable to recover such data.

Planned Downtime

Figure 22:
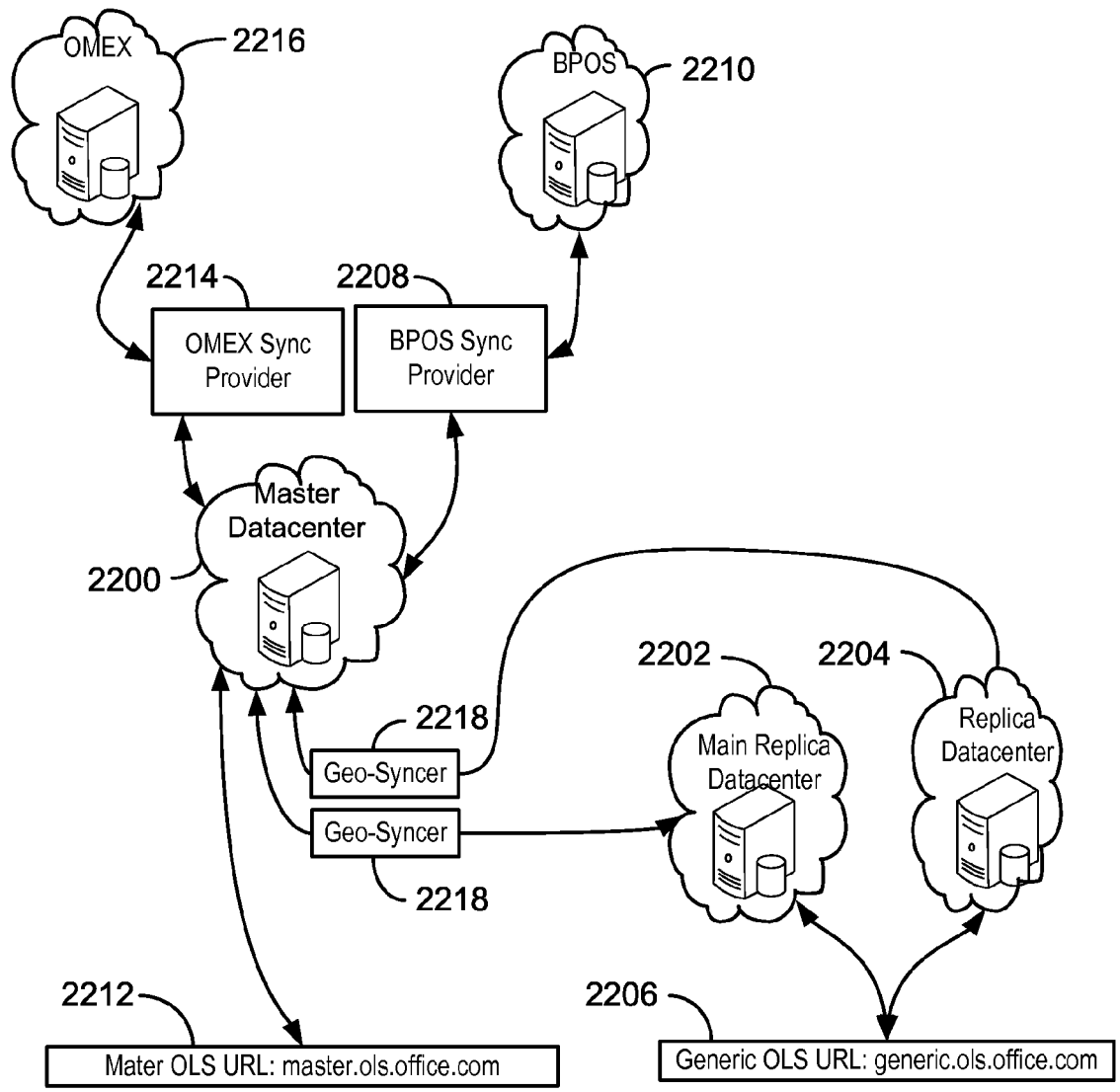
FIG. 22 is a schematic showing a first step for executing a planned downtime.

FIG. 22 is a schematic showing a first step for executing a planned downtime. The first step may include stopping servicing calls from a master datacenter 2200 and bringing replica datacenters 2202 and 2204 to parity, as described further below.

In some cases, the master datacenter 2200 within the OLS may be purposefully taken down. For example, the master datacenter 2200 may have a faulty configuration that is to be corrected, or there may be a major service update available for the master datacenter 2200 that can only be implemented when the master datacenter 2200 is down.

When the master datacenter 2200 is to be taken down, a main replica datacenter 2202 is brought online as the new master datacenter. The main replica datacenter 2202 may be a replica datacenter that is located close to the master datacenter 2200 and is the first replica datacenter to be promoted to a new master datacenter if the master datacenter 2200 is taken down.

In some embodiments, each datacenter is assigned a number, starting from 1. For example, the master datacenter 2200 may be assigned a number of 1, the main replica datacenter 2202 may be assigned a number of 2, and the other replica datacenter 2204 may be assigned a number of 3. Each datacenter 2200, 2202, and 2204 may be self-aware of its assigned number, as well as the maximum number. This numbering system may be useful for making certain determinations during disaster scenarios. For example, if the master datacenter 2200 fails, the main replica datacenter 2204 may be automatically promoted to the new master datacenter, since its number is 2. If the main replica datacenter 2204 is not available, the replica datacenter 2204 may then be promoted to the new master datacenter, since its number is 3.

As discussed above, the first step in executing a planned downtime may be stopping servicing calls from the master datacenter 2200 and bringing the main replica datacenter 2202 to parity. This may be accomplished by removing the master datacenter 2200 from the generic OLS URL 2206, i.e., generic.ols.office.com, rotation. The syncer component of a BPOS sync provider 2208 of a BPOS partner 2210 may be stopped, and the publish component may continue until there is nothing left to publish. All calls to a master OLS URL 2212, i.e., master.ols.office.com, may return a TemporarilyUnavailable exception. This includes calls to an OMEX Sync Provider 2214 of an OMEX partner 2216, the OLS API, and the OLS Partner APIs. In addition, geo-syncers 2218 may continue the geo-syncing process until there is nothing else left to sync. At the end of this process, all replica datacenters 2202 and 2204 will have synced all syncable data from master datacenter 2200 and, for all intents and purposes, will be at parity with the master datacenter 2200.

Figure 23:
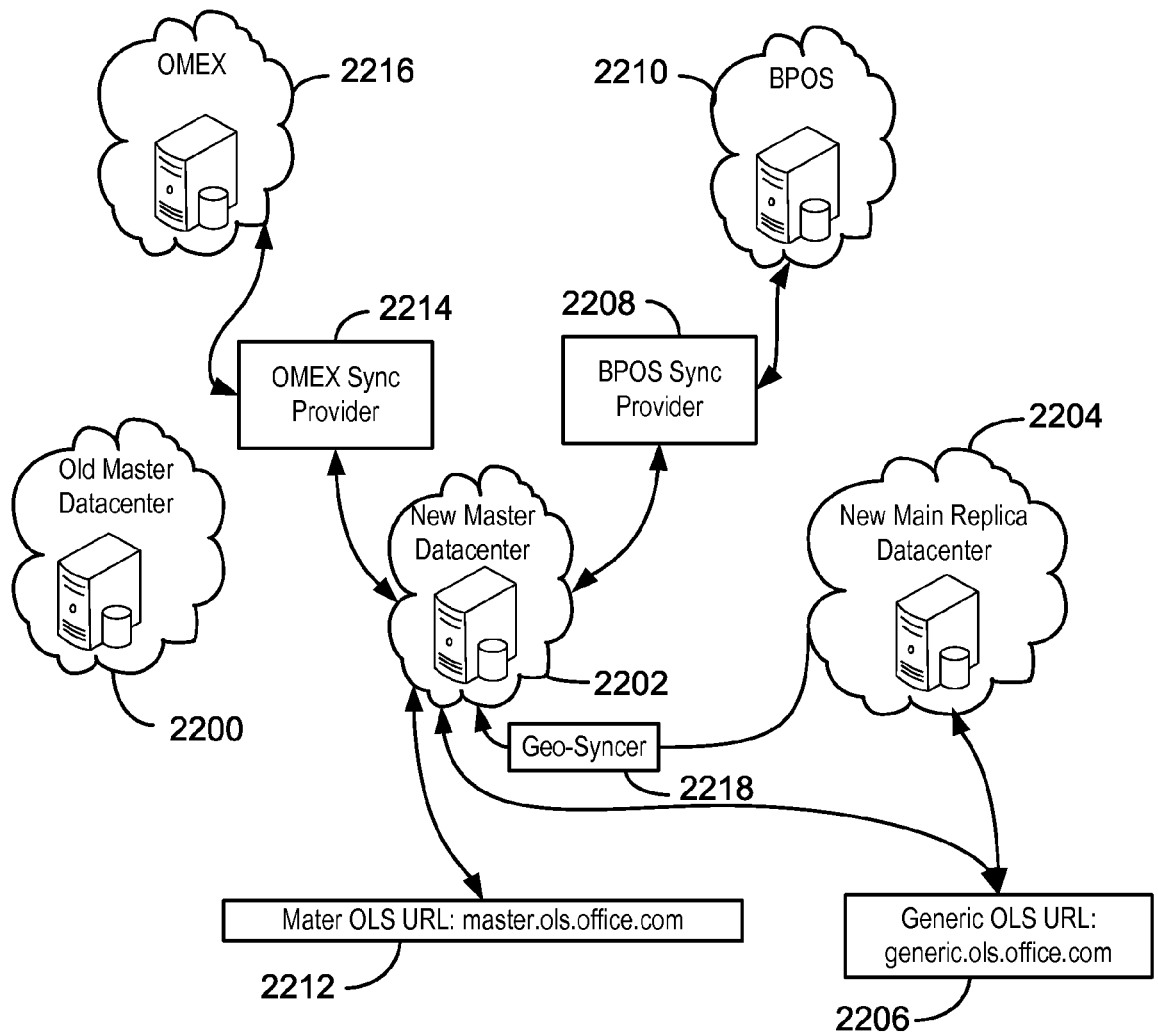
FIG. 23 is a schematic showing a second step for executing a planned downtime.

FIG. 23 is a schematic showing a second step for executing a planned downtime. Like numbered items are as described with respect to FIG. 22. The second step may involve promoting the main replica datacenter 2202 to the new master datacenter, as described further below.

During this step of the planned downtime, the database of the BPOS partner 2210 may be copied from the old master datacenter, i.e., the datacenter 2200, to the new master datacenter 2202. The lock configuration files may be updated. All components of the OMEX sync provider 2214 and the BPOS sync provider 2208 may be turned on in the new master datacenter 2204. All OLS API and OLS partner API calls may be turned on in the new master datacenter 2202. The master OLS USL 2212 may be mapped to the new master datacenter 2202. In addition, the replica datacenter 2204 may be designated as the new main replica datacenter, and the geo-syncing process may be turned on.

At the end of this step, the old main replica datacenter has been promoted to the new master datacenter 2202. Thus, the old master datacenter 2200 can now be taken down for maintenance, upgrades, or the like. These steps may be reversed to convert the old master datacenter 2200 back to the current master datacenter.

In some embodiments, it may be desirable to bring new replica datacenters online A new replica datacenter may be deployed by adding a record for the replica datacenter to the lock configuration file of every datacenter with the syncing set to "off." If a record is added, the replica datacenter is indeed a new replica datacenter. Otherwise, it is an existing replica datacenter, and the following steps do not apply. Once a record is added to the lock configuration file, the master datacenter may start collecting changes to be synced to the new replica datacenter. Data may be copied from the master datacenter to the new replica datacenter. After copying is complete, the new replica datacenter may turn geo-syncing for itself on in the master datacenter's lock configuration file. In addition, the maximum number of datacenters may be updated in every datacenter. Furthermore, the new replica datacenter may be added to the global load balanced URL.

Unplanned Downtime

Unplanned downtime could occur due to various reasons. Any unplanned downtime of a replica datacenter, e.g., either intermittent or persistent downtime, can be handled agilely with modification of the global load balancer to redirect to another replica datacenter. The maximum downtime may depend on the TTL time of the DNS entry of the global load balancer. However, unplanned downtime of a master datacenter is less agilely handled. Because the master datacenter is the only datacenter that performs provisioning and services certain API calls, traffic cannot simply be redirected to a backup datacenter.

If the master datacenter unexpectedly becomes unavailable for an extended period of time, the main replica datacenter can be promoted to the new master datacenter. This may be accomplished by updating the lock configuration file, turning on the BPOS sync provider in the main replica datacenter, and turning on the OMEX sync provider in the main replica datacenter. In addition, all OLS API and OLS Partner API calls may be turned on in the main replica datacenter, the master OLS URL may be mapped to the main replica datacenter, another replica datacenter may be designated as the main replica datacenter, and the geo-syncing process may be turned on. If a new master datacenter has been designated, and the old master datacenter unexpectedly comes back online, data inconsistencies may be created as the old master datacenter geo-syncs old information into the replica datacenters. Therefore, steps may be taken to ensure that the old master datacenter cannot come back online automatically. For example, a configuration deployment may be used to turn off the old master datacenter.

General Method and System for Application Licensing

Figure 24:
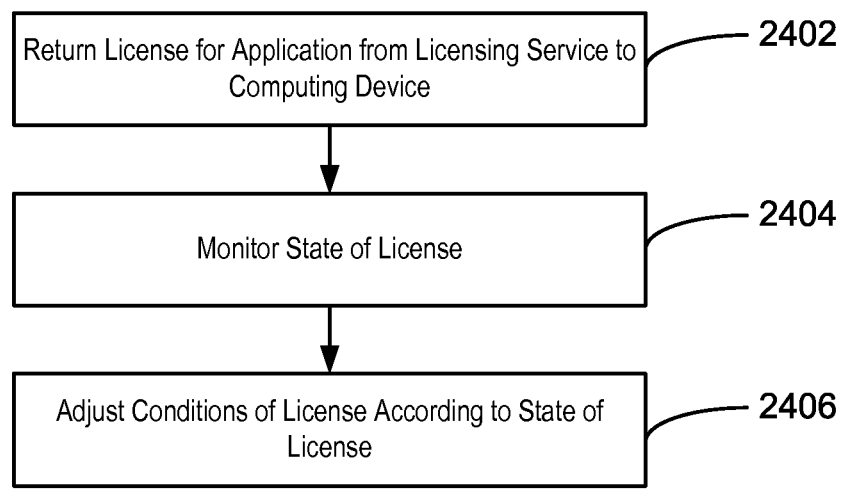
FIG. 24 is a process flow diagram of a method for application licensing.

FIG. 24 is a process flow diagram of a method 2400 for application licensing. In various embodiments, the method 2400 is executed by the licensing service, e.g., the OLS, within the licensing system described herein. The method 2400 begins at block 2402, at which a license for an application is returned from a licensing service to a computing device. The license may be returned in response to receiving a call requesting the license from the computing device, wherein the license is based on the computing device or a user of the computing device, or any combination thereof. In various embodiments, the license is based on multiple computing devices, wherein the number of computing devices that may be used for the license is specified by the conditions of the license. The application may be a service, program, or application, which may be provided by a marketplace service or a third party service. Further, the license may be a license for multiple applications or multiple services. In addition, the license may be a subscription license or a perpetual license.

At block 2404, the licensing service monitors a state of the license. Monitoring the state of the license may include detecting a fraudulent activity, wherein a fraudulent activity is an activity that is not authorized by the conditions of the license. In various embodiments, monitoring the state of the license includes determining if the license is expired. The state of the license may be synchronized across multiple computing devices that are used by the user.

At block 2406, the conditions of the license are adjusted according to the state of the license. In some embodiments, adjusting the conditions of the license includes deprovisioning the license if the license is expired. Adjusting the conditions of the license may also include reprovisioning the license if the license is renewed by the user.

In some embodiments, the user may be allowed to use the application without remaining connected to the licensing service. However, the user may be requested to connect the computing device to the licensing service periodically in order to allow for the monitoring of the state of the license. The license may be deprovisioned if the user does not connect to the licensing service for a specified period of time.

It is to be understood that the process flow diagram of FIG. 24 is not intended to indicate that the steps of the method 2400 are to be executed in any particular order, or that all of the steps are to be included in every case. Further, any number of additional steps may be included within the method 2400, depending on the details of the specific implementation.

Method for Licensing Services

A method for licensing services is disclosed herein. The method includes using, within a licensing service, a poll model to license a service to a user or a computing device, or any combination thereof. In various embodiments, another method for licensing services may also include using, within a licensing service, a push model to license a service to a user or a computing device.

Method for Providing Business Continuity

A method of providing business continuity including a pool of processes which continuously distribute data within a datacenter or across multiple geographically disperse datacenters is also disclosed herein. Further, a system for providing business continuity, robustness, and redundancy is disclosed herein. The system includes a set of locks, a set of processes which obtain the locks, and a queue of changes to business data or licensing data, or both. The system also includes a mechanism to manage the changes and a mechanism to write the business data or the licensing data, or both, across datacenters.

Method for Application Licensing Using Sync Providers

Figure 25:
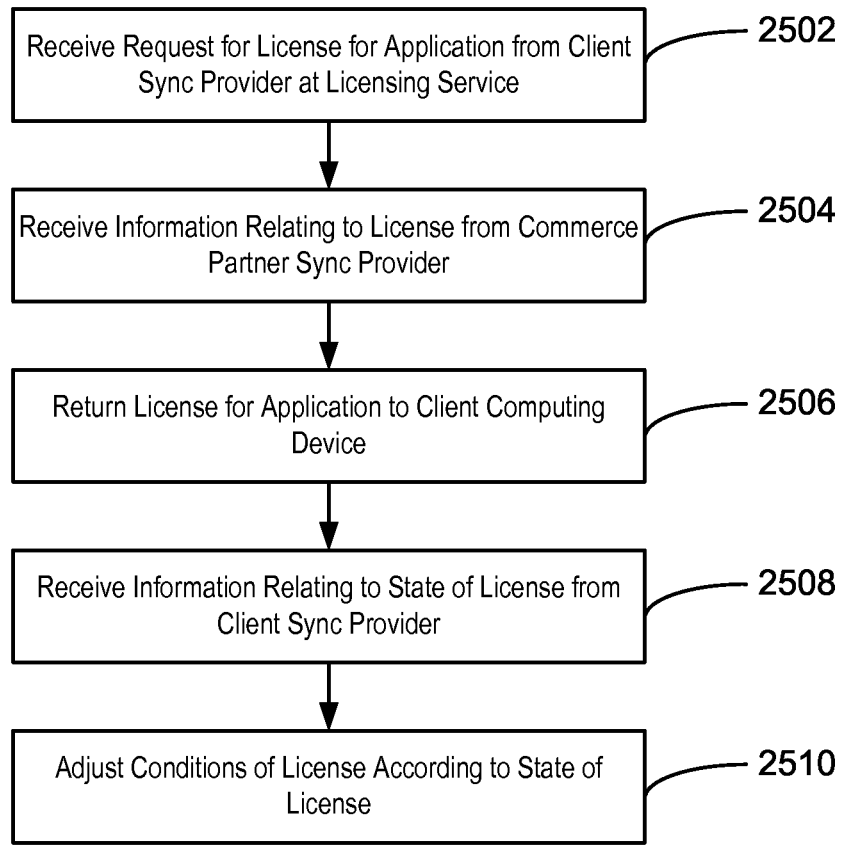
FIG. 25 is a process flow diagram of a method for licensing an application using sync providers.

FIG. 25 is a process flow diagram of a method 2500 for licensing an application using sync providers. The application that is to be licensed may be a word processing application, a spreadsheet application, or a presentation application, for example. In addition, the application may be a service that is provided by a specific commerce partner.

The method begins at block 2502, at which a request for a license for an application is received from a client sync provider at a licensing service. In some embodiments, the client sync provider corresponds to a specified client computing device, and the license permits use of the application on the specified client computing device. Further, in some embodiments, the license permits use of the application on the client computing device based on an input of client credentials.

At block 2504, information relating to the license is received from a commerce partner offering the application via a commerce partner sync provider. In some embodiments, the licensing service includes a number of provisioning APIs for communicating with the client sync provider and the commerce partner sync provider.

At block 2506, the license for the application is returned to a client computing device. At block 2508, information relating to the state of the license is received from the client sync provider. Information relating to the state of the license may also be received from the commerce partner sync provider. In some embodiments, the state of the license is synchronized across a number of client computing devices corresponding to the client sync provider. Further, in some embodiments, the state of the license is directly monitored via the licensing service.

At block 2510, the conditions of the license are adjusted according to the state of the license. For example, the license may be deprovisioned if the license has an expired state, or the license may be reprovisioned if the license has a renewed state. Further, the license may be converted to a different license is the license has a converted state.

It is to be understood that the process flow diagram of FIG. 25 is not intended to indicate that the steps of the method 2500 are to be executed in any particular order, or that all of the steps are to be included in every case. Further, any number of additional steps may be included within the method 2500, depending on the details of the specific implementation. For example, in some embodiments, the method 2500 includes licensing an application using a system of pluggable sync providers including one or more client sync providers and a number of commerce partner sync providers.

Method for Licensing an Application Using Multiple Forms of Licensing

Figure 26:
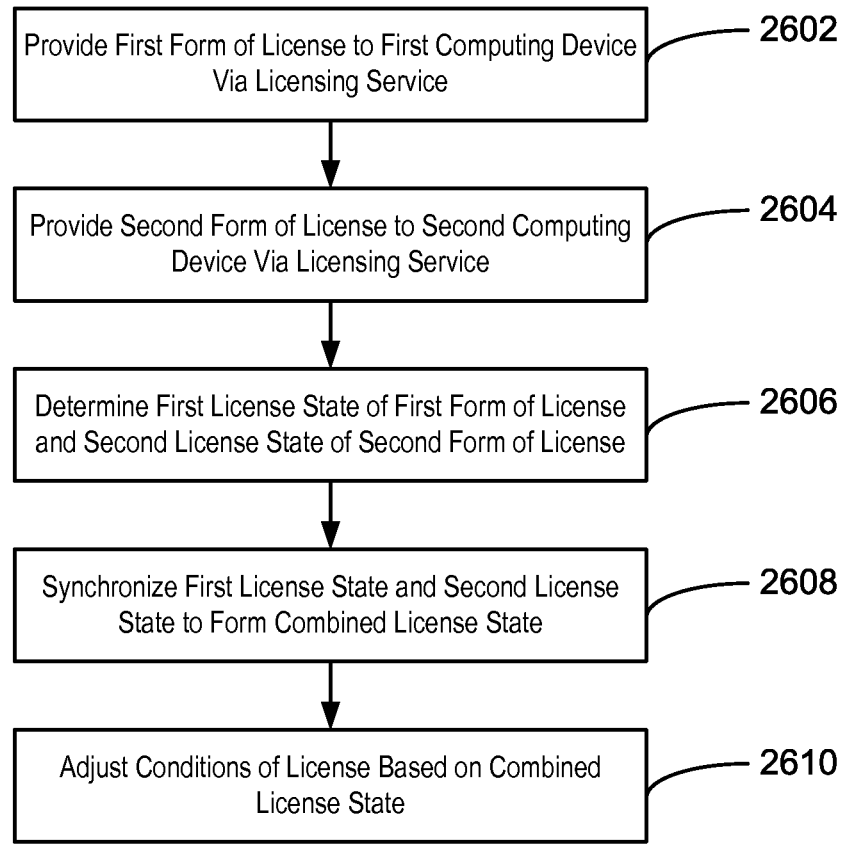
FIG. 26 is a process flow diagram of a method for licensing an application using multiple forms of licensing.

FIG. 26 is a process flow diagram of a method 2600 for licensing an application using multiple forms of licensing. The method begins at block 2602, at which a first form of a license is provided to a first computing device via a licensing service. The first form of the license may be provided to the first computing device in response to an input by a user, such as an input of user credentials or a product key. At block 2604, a second form of the license is provided to a second computing device via the licensing service. The second form of the license may be provided to the second computing device in response to an input by a user, such as an input of user credentials or a product key. In various embodiments, the first form of the license and the second form of the license include a product key based license, an online user based license, a device based license, or a token based license, or any combinations thereof.

A first state of the first form of the license and a second state of the second form of the license are determined at block 2606, and the first state and the second state are synchronized to form a combined license state at block 2608. Further, at block 2610, the conditions of the license are adjusted based on the combined license state. In some embodiments, the combined license state includes an expired state, a renewed state, a converted license state, or an effective state, or any combinations thereof. If the combined license state is an expired state, adjusting the conditions of the license may include deprovisioning the license. If the combined license state is a renewed state, adjusting the conditions of the license may include reprovisioning the license. If the combined license state is an effective state, the conditions of the license may not be adjusted. If the combined license state is a converted license state, the license may be converted to a different license.

It is to be understood that the process flow diagram of FIG. 26 is not intended to indicate that the steps of the method 2600 are to be executed in any particular order, or that all of the steps are to be included in every case. Further, any number of additional steps may be included within the method 2600, depending on the details of the specific implementation. For example, the method 2600 may include detecting a fraudulent activity based on the combined license state, wherein the fraudulent activity includes an activity that is not authorized by the conditions of the license. The conditions of the license may then be adjusted based on the detection of the fraudulent activity.

Method for Licensing Applications for Devices

Figure 27:
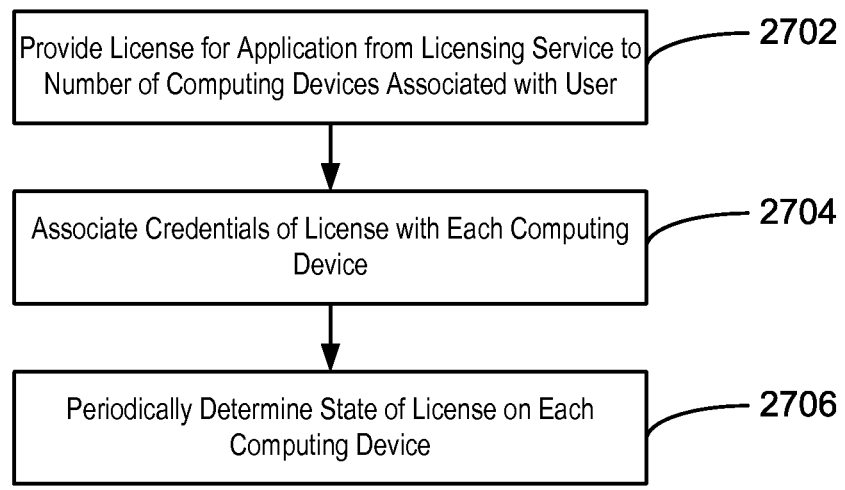
FIG. 27 is a process flow diagram of a method for licensing an application for devices.

FIG. 27 is a process flow diagram of a method 2700 for licensing an application for devices. The method begins at block 2702, at which a license for an application is provided from a licensing service to a number of computing devices being used by a user. The license for the application may include credentials. The license may be provided to each computing device in response to an input by a user.

At block 2704, the credentials are associated with each of the computing devices. For example, an identification of each computing device may be associated with the credentials. Once the credentials have been associated with a particular computing device, the user may be allowed to use the application on the computing device for a specified period of time without connecting to the licensing service.

At block 2706, the state of a subscription corresponding to the license on each of the computing device is periodically determined. In various embodiments, the state of the subscription on each computing device is determined at configurable time periods specified by the conditions of the license. The state of the subscription on a computing device may be determined in response to a check subscription state call received from the computing device. The check subscription state call may include an outcome of a subscription state check performed by the computing device. The conditions of the license may then be adjusted based on the state of the subscription on each computing device. For example, the license may be deprovisioned if the subscription is expired on a particular computing device, or the license may be reprovisioned if the subscription is renewed on a particular computing device. In addition, the license may be converted to a different license if the subscription has been converted on a particular computing device.

It is to be understood that the process flow diagram of FIG. 27 is not intended to indicate that the steps of the method 2700 are to be executed in any particular order, or that all of the steps are to be included in every case. Further, any number of additional steps may be included within the method 2700, depending on the details of the specific implementation.

Method for Providing User Based Licenses for Applications

Figure 28:
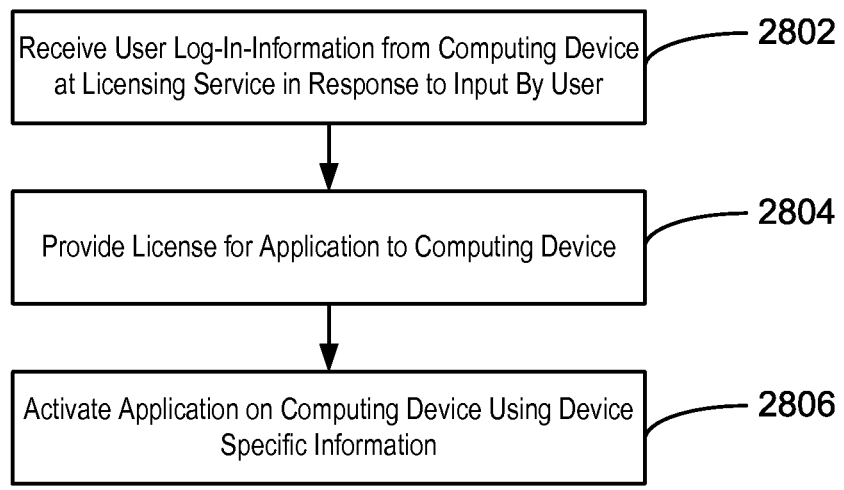
FIG. 28 is a process flow diagram of a method for providing user based licensing of an application.

FIG. 28 is a process flow diagram of a method 2800 for providing user based licensing of an application. The method begins at block 2802, at which user log-in information is received from a computing device at a licensing service in response to an input by a user. The user log-in information may be associated with the licensing service, or a commerce partner associated with the licensing service.

At block 2804, a license for an application is provided to the computing device, wherein the license includes device specific information associated with the user. The device specific information may include information relating to the computing devices on which the user is provisioned to use the application according to the license. In addition, the device specific information may include a total number of computing devices on which the user is allowed to be provisioned to use the application according to the license.

At block 2806, the application is activated on the computing device using the input of the device specific information. The user may then be allowed to use the application on the computing device. In some embodiments, the user is allowed to use the application on the computing device for a specified period of time without connecting the computing device to the licensing service.

In some embodiments, the state of the license may be periodically determined in response to an input from the computing device, wherein the input includes an outcome of a license state check performed by the computing device. The state of the license may be checked at configurable time periods specified by the licensing service or the license itself. The conditions of the license may then be adjusted based on the state of the license.

It is to be understood that the process flow diagram of FIG. 28 is not intended to indicate that the steps of the method 2800 are to be executed in any particular order, or that all of the steps are to be included in every case. Further, any number of additional steps may be included within the method 2800, depending on the details of the specific implementation. For example, the license for the application may be roamed across a number of computing devices that are used by the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing user based licensing of an application, comprising:
   receiving user log-in information from a computing device at a licensing service in response to an input by a user;
   providing a license for an application to the computing device, wherein the license comprises device specific information associated with the user;
   activating the application on the computing device using the device specific information;
   periodically determine a state of the license in response to an input from the computing device, wherein the input comprises a license state check performed by the computing device at configurable time periods specified by the conditions of the license; and
   adjust conditions of the license according to the state of the license.

2. The method of claim 1, comprising deprovisioning the license if the state of the license is expired.

3. The method of claim 1, comprising reprovisioning the license if the state of the license is renewed.

4. The method of claim 1, comprising converting the license to a second license if the state of the license is converted.

5. The method of claim 1, comprising roaming the license for the application across a plurality of computing devices that are used by the user.

6. The method of claim 1, comprising allowing the user to use the application on the computing device for a specified period of time without connecting the computing device to the licensing service.

7. The method of claim 1, wherein the user log-in information comprises user log-in information for the licensing service.

8. A system for providing user based licensing of an application, comprising:
- a storage device to store instructions of a licensing service;
- a server communicatively coupled to a computing device, the server comprising a processing device to carry out operations of the licensing service configured to:
- receive user log-in information from the computing device in response to an input by a user;
- provide a license for an application to the computing device, wherein the license comprises device specific information associated with the user; and activate the application on the computing device using the device specific information;
- periodically determine a state of the license in response to an input from the computing device, wherein the input comprises a license state check performed by the computing device at configurable time periods specified by the conditions of the license; and
- adjust conditions of the license according to the state of the license.

9. The system of claim 8, wherein the device specific information comprises a total number of computing devices on which the user is allowed to be provisioned to use the application according to the license.

10. The system of claim 8, wherein the device specific information comprises information relating to a plurality of computing devices on which the user is provisioned to use the application according to the license.

11. The system of claim 8, wherein the licensing service is configured to allow for roaming of the license for the application across a plurality of computing devices that are used by the user.

12. The system of claim 8, wherein the licensing service is configured to allow the user to use the application on the computing device for a specified period of time without connecting the computing device to the licensing service.

13. One or more computer-readable storage media device comprising a plurality of instructions that, when executed by a processor, cause the processor to:
- receive user log-in information from a computing device;
- provide a license for an application to the computing device, wherein the license comprises device specific information associated with a user;
- activate the application on the computing device using the device specific information;
- periodically determine a state of the license in response to an input from the computing device, wherein the input comprises a license state check performed by the computing device at configurable time periods specified by the conditions of the license; and
- adjust conditions of the license according to the state of the license.

14. The one or more computer-readable storage media of claim 13, wherein the instructions cause the processor to allow the user to use the application on the computing device in response to an input of the user log-in information.

15. The one or more computer-readable storage media of claim 13, wherein the device specific information comprises information relating to computing devices on which the user is provisioned to use the application.

16. The method of claim 1, wherein periodic state determination enables the application to be used offline at the computing device wherein the adjustment comprises disabling a license when the user is offline based on the state determination.

17. The method of claim 1, wherein the configurable time periods are provided to the computing device from the licensing service.

18. The system of claim 8, wherein periodic state determination enables the application to be used offline at the computing device wherein the adjustment comprises disabling a license when the user is offline based on the state determination.

19. The system of claim 8, wherein the configurable time periods are provided to the computing device from the licensing service.

20. The one or more computer-readable storage media of claim 13, wherein:
- periodic state determination enables the application to be used offline at the computing device wherein the adjustment comprises disabling a license when the user is offline based on the state determination; and
- the configurable time periods are provided to the computing device from the licensing service.

* * * * *

UNITED STATES PATENT AND TRADEMARK OFFICE
CERTIFICATE OF CORRECTION

| | | |
|---|---|---|
| PATENT NO. | : 8,832,851 B2 | Page 1 of 1 |
| APPLICATION NO. | : 13/680120 | |
| DATED | : September 9, 2014 | |
| INVENTOR(S) | : Li et al. | |

It is certified that error appears in the above-identified patent and that said Letters Patent is hereby corrected as shown below:

In the Claims

Claim 1, line 7, delete the word "determine" and replace it with --determining--.

Claim 1, line 10, delete the word "adjust" and replace it with --adjusting--.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO.         : 8,832,851 B2
APPLICATION NO.    : 13/680120
DATED              : September 9, 2014
INVENTOR(S)        : Li et al.

It is certified that error appears in the above-identified patent and that said Letters Patent is hereby corrected as shown below:

In the Claims

Column 36, line 47, Claim 1, delete the word "determine" and replace it with --determining--.

Column 36, line 52, Claim 1, delete the word "adjust" and replace it with --adjusting--.

This certificate supersedes the Certificate of Correction issued November 11, 2014.

Signed and Sealed this
Ninth Day of December, 2014

Michelle K. Lee
*Deputy Director of the United States Patent and Trademark Office*